United States Patent [19]

Schmidt

[11] Patent Number: 5,189,867

[45] Date of Patent: * Mar. 2, 1993

[54] AQUATIC VEGETATION CUTTER

[76] Inventor: Michael Schmidt, 51 Tamarack Rd., Mahopac, N.Y. 10541

[*] Notice: The portion of the term of this patent subsequent to Dec. 12, 2006 has been disclaimed.

[21] Appl. No.: 598,673
[22] PCT Filed: Oct. 15, 1989
[86] PCT No.: PCT/US89/01505
  § 371 Date: Oct. 23, 1990
  § 102(e) Date: Oct. 23, 1990

Related U.S. Application Data

[63] Continuation-in-part of Ser. No. 181,323, Apr. 13, 1988, Pat. No. 4,885,902.

[51] Int. Cl.$^5$ .................................. A01D 45/08
[52] U.S. Cl. .............................. 56/8; 56/10.3; 56/11.2; 56/257
[58] Field of Search ............... 56/8, 9, 10.3, 10.4, 56/11.2, 11.7, 17.2, 17.6, 236, 257, 242, 264, 266, DIG. 6; 74/798, 49, 198, 206, 216.3

[56] References Cited

U.S. PATENT DOCUMENTS

| | | |
|---|---|---|
| 1,269,139 | 6/1918 | Welch ........................... 56/8 |
| 1,387,578 | 8/1921 | Yost . |
| 1,986,177 | 1/1935 | Zastoupil . |
| 2,065,733 | 12/1936 | Pearson ......................... 56/8 |
| 2,223,641 | 12/1940 | Sanger .......................... 56/8 |
| 2,343,848 | 5/1944 | Rabl . |
| 2,417,613 | 3/1947 | Radabaugh . |
| 2,528,470 | 10/1950 | Elder ........................... 74/798 |
| 2,536,803 | 1/1951 | Gleason ........................ 74/798 |
| 2,540,616 | 2/1951 | Hasslacher .................... 56/10.3 |
| 2,692,508 | 10/1954 | Orr ............................. 56/257 |
| 2,907,162 | 10/1959 | Rebikoff ....................... 56/9 |
| 3,227,005 | 1/1966 | Johnson ........................ 74/798 |
| 3,477,315 | 11/1969 | Macks . |
| 3,499,271 | 3/1970 | Drigert ......................... 56/8 |
| 3,520,117 | 7/1970 | Pepke et al. . |
| 3,601,956 | 8/1971 | Akermanis . |
| 3,631,742 | 1/1972 | Hoffmeister . |
| 3,765,156 | 10/1973 | Porter .......................... 56/8 |
| 3,808,779 | 5/1974 | Randall . |
| 3,973,378 | 8/1976 | Bartasevich . |
| 4,060,010 | 11/1987 | Heden . |
| 4,202,155 | 5/1980 | Stewart ......................... 56/9 |
| 4,617,838 | 10/1986 | Anderson ....................... 74/798 |

FOREIGN PATENT DOCUMENTS

| | | |
|---|---|---|
| 1507342 | 12/1969 | Fed. Rep. of Germany . |
| 787268 | 9/1935 | France . |
| 1051916 | 2/1952 | France . |
| 2222005 | 10/1974 | France . |
| 125643 | 5/1927 | Switzerland . |
| 126354 | 7/1928 | Switzerland . |
| 18665 | of 1913 | United Kingdom . |
| 880317 | 10/1961 | United Kingdom . |

OTHER PUBLICATIONS

Erectoweld Inc.-Aquamarine Sales Literature.
Popular Science, p. 117, Apr. 1950.

Primary Examiner—Hoang C. Dang
Attorney, Agent, or Firm—Schweitzer Cornman & Gross

[57] ABSTRACT

A light weight, portable aquatic vegetation cutter having a handle disposed at one end of a mounting rod, a motor at the other end of the mounting rod, the motor being disposed essentially centrally between two reciprocating type cutting blade assemblies ranging in opposite directions from the motor, the handle being adapted substantially to indicate the horizontal disposition of the cutting blade assemblies and permitting their realignment relative to the direction in which aquatic vegetation cutting takes place, the position of the motor with the cutting blade assemblies, being adjustable in two directions relative to the vertical, that are perpendicular to each other, a boat mounting attachable from the mounting rod, providing three additional directions of yieldable freedom of motion, audible and visual means for signaling a problem in cutting ability of the aquatic vegetation cutter, a switch enabling momentary reversal of the polarity of DC current to the motor, for freeing matter caught between the toothed reciprocating cutting blade and toothed stationary cutting blade of a cutting blade assembly, and a switch for preventing turning the motor on when it is not immersed into a sufficient depth of water.

36 Claims, 13 Drawing Sheets

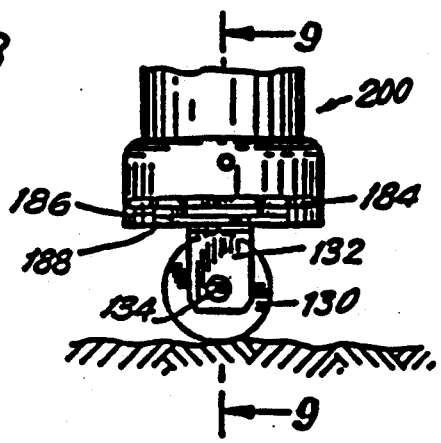
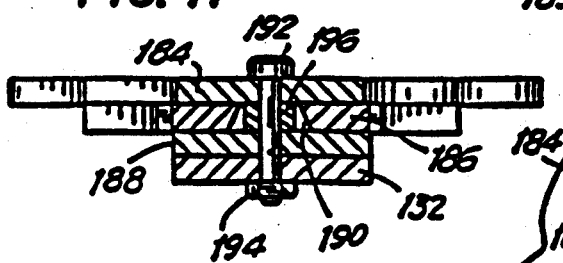
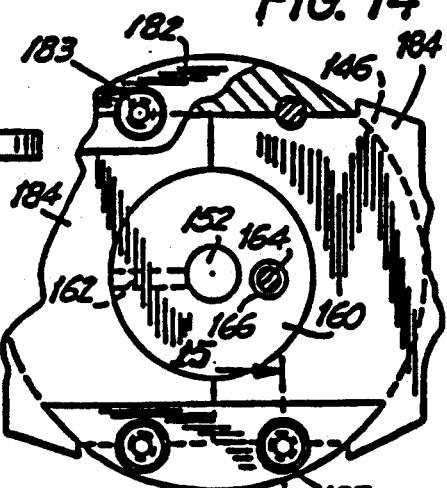
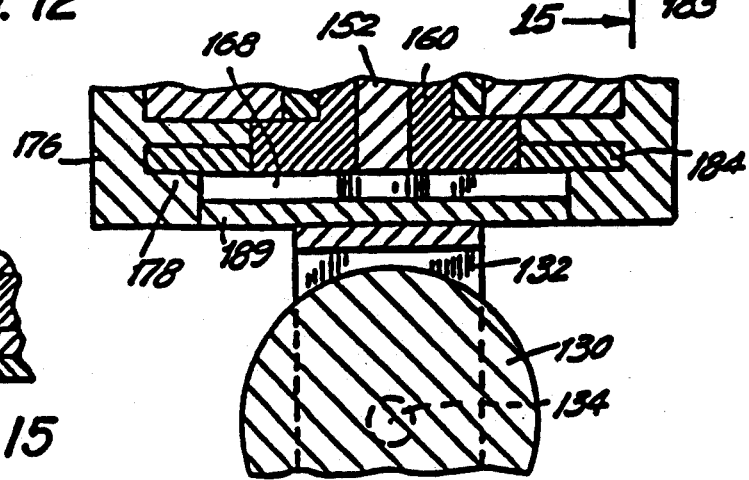

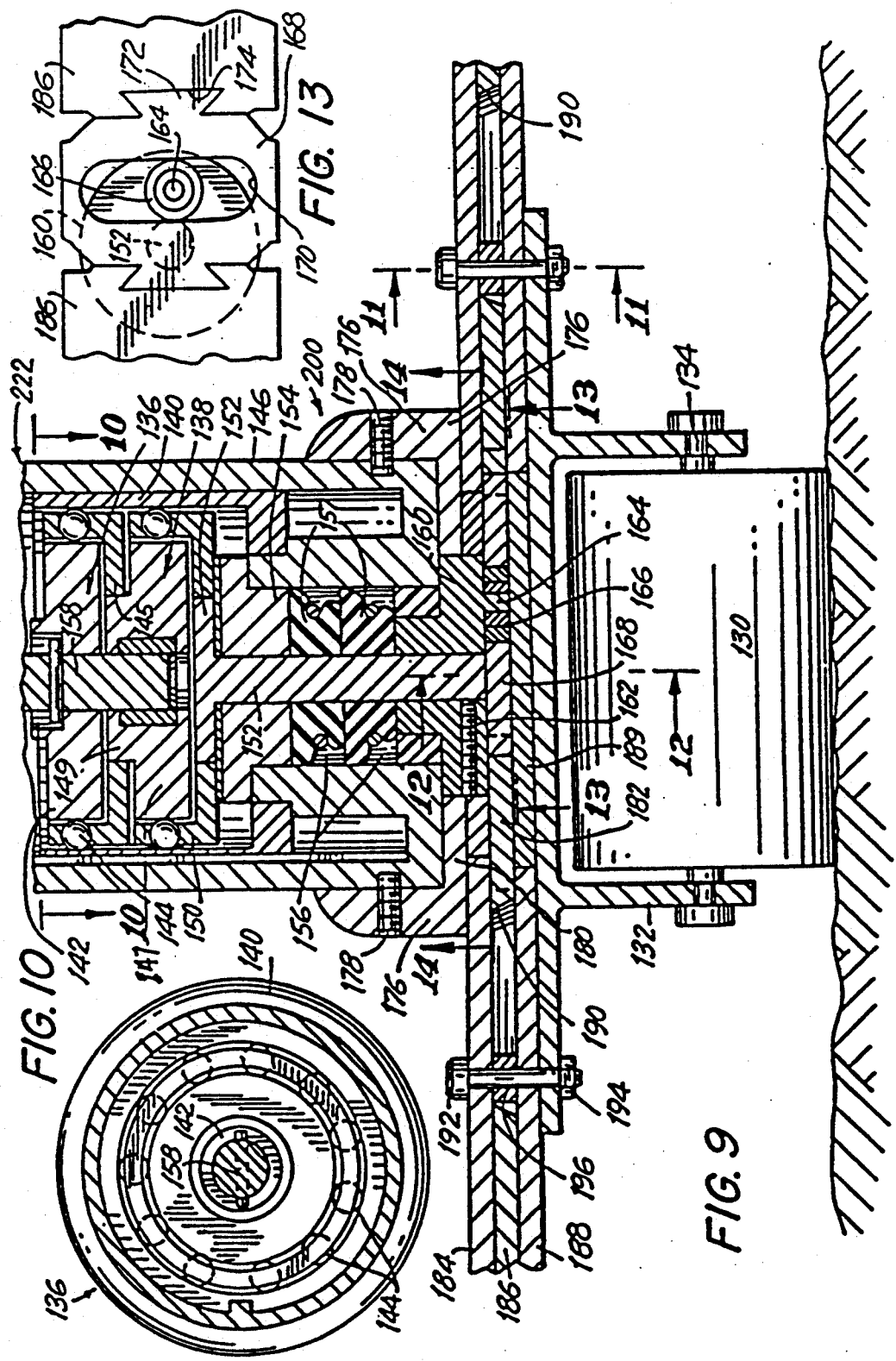

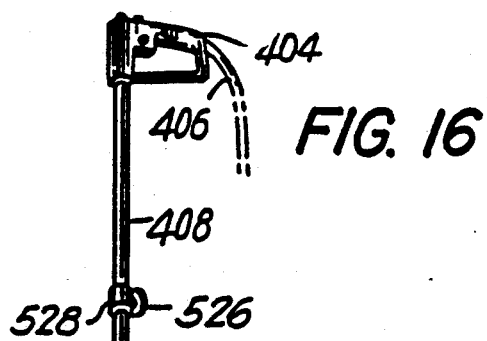
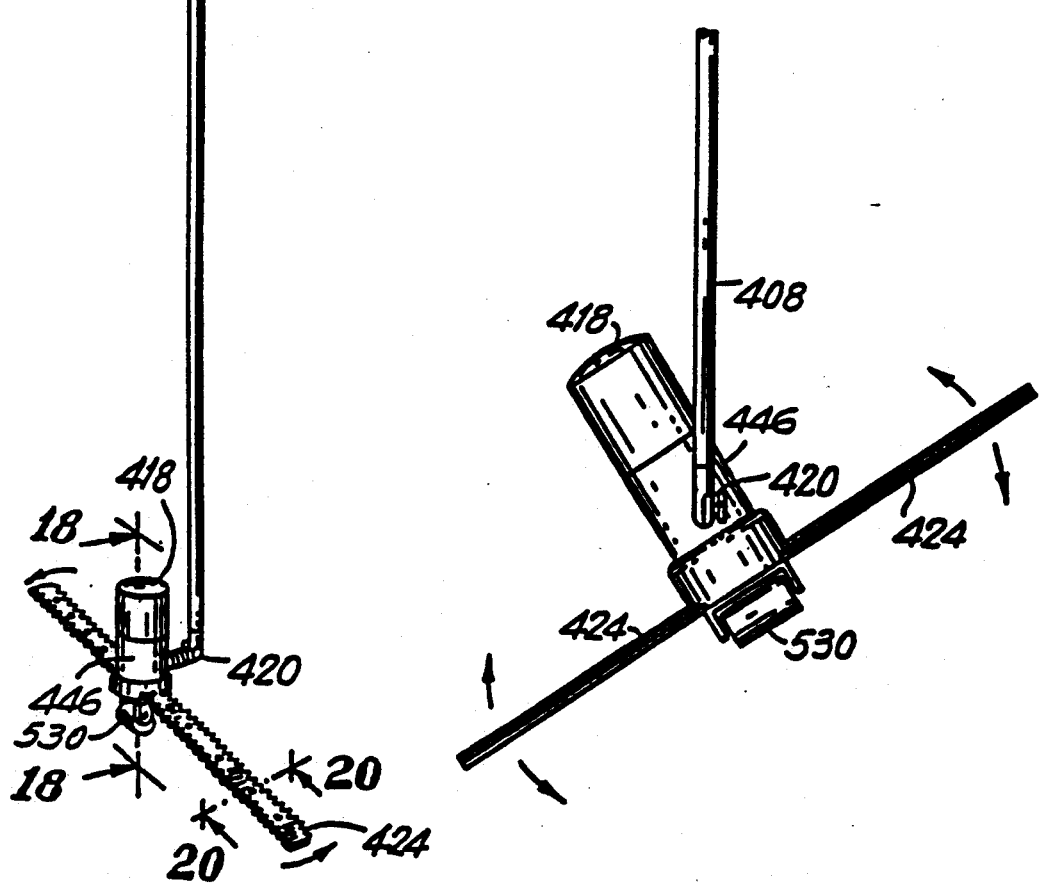

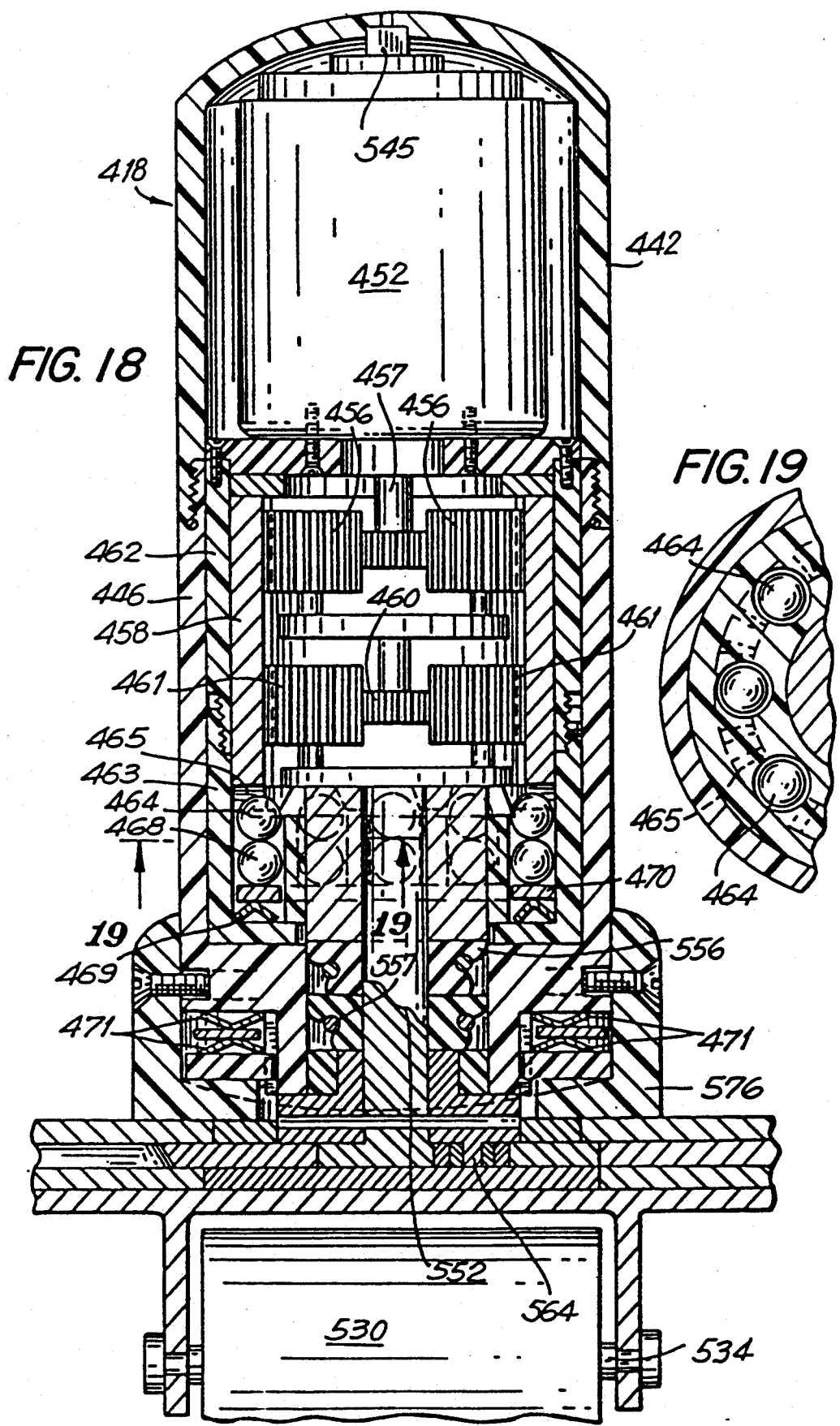

AQUATIC VEGETATION CUTTER

This is a continuation-in-part application of U.S. Ser. No. 181,323, filed on Apr. 13, 1988, now U.S. Pat. No. 4,885,902.

FIELD OF THE INVENTION

The invention relates to an aquatic vegetation cutter for the efficient removal of aquatic weeds such as algae and the like growing from the bottom bodies of water, or for the harvesting of aquatic crops.

BACKGROUND OF THE INVENTION

The growth of most aquatic vegetation, such as algae, is harmful to the ecology of a body of water. It substantially contributes to the eutrophication of the body of water and this eventually leads to the extinction of all life from the water and to the formation of a slimy overgrowth. This renders the water unsightly and useless for practically any purpose. Harvesting of aquatic vegetation growth, along with the building of sewers to prevent nutrient run-off into the water, are among the principal measures to save bodies of water from eutrophication.

Aquatic weed infestations adversely effect boating, drainage, irrigation, fish and wildlife, and recreation. Heavy infestations may block or impede boat movement, damage propellers, or block engine cooling systems. Water flow in drainage and irrigation ditches may be seriously retarded by aquatic plants.

Infestations may render the area unsuitable for fish by exhausting dissolved oxygen in basic food production, by restricting the movement of fish or by rendering shallow water unsuitable for spawning.

Excessive growth of aquatic plants interferes with recreational use of water in lakes and ponds. In addition to preventing access to an the use of water for hunting and fishing, aquatic plants often preclude boating, swimming, skiing and other water oriented activities reducing the recreational value of water resources.

Improving water quality by controlling aquatic weeds will restore the balance of the body of water and increase the value of waterside property.

The harvesting of aquatic vegetation is carried out practically exclusively with clumsy, inefficient machinery which is generally very large and provides its own flotation. The operator of the large machinery usually rides the machine itself in the water. Alternative means for the removal of aquatic vegetation growth includes various toxic chemicals, but these are expensive and have their own dangerous ecological side effects. There is no simple, relatively small machinery available to small riparian owners for the removal of aquatic vegetation growth.

There are various smaller aquatic vegetation cutting devices disclosed in the prior art, however, none of them appear to have been commercially realized. U.S. Pat No. 3,499,271 shows an underwater weed cutter attachment for the drive shaft of an outboard motor and the propeller of the motor is, in turn, attached to the drive shaft protruding from the cutter attachment. Two sets of flat reciprocating blades are powered from the drive shaft of the outboard motor through a power transmission.

U.S. Pat. No. 3,601,956 discloses a hand operated underwater cutter in which double edge blades are attached to opposite sides of a header which is mounted at the end of a shaft which permits the immersion of the header and the blades into th water. The blades pivot away from the direction of movement to permit uncut weeds from slipping out of the end of the blade to prevent it from fouling.

French patent No. 1,051,916; and Swiss patents Nos. 125,643 and 126,354 also describe simple, rudimentary aquatic weed cutting devices or features thereof.

OBJECT AND BRIEF DESCRIPTION OF THE INVENTION

The object of the present invention is to provide an aquatic vegetation cutter or harvester which is small, portable, can be inexpensively produced, and can be easily used either from a boat, a pier, the shore, or by wading in the water. The device of the present invention can be operated as a hand held device or attached to a support, such as the side or transom of a boat or a stationary support, such as a sawhorse. The aquatic vegetation cutter, therefore, has to be portable, of light weight and not bulky, it should adapt easily to frequent and rapid variations in depth and inclination of the bottom of the water, it should be able to cope with the sudden appearance of larger objects, such as rocks, cans and the like and it should remain free from entanglement and snagging when encountering objects which it cannot or should not cut, such as ropes, cables, underwater tree branches and the like.

The object of the invention is achieved by a aquatic vegetation cutter or harvester in accordance with the present invention, which comprises a motor, suitably a direct current electrical motor for generating a driving force, two reciprocating type cutting blade assemblies disposed in a substantially opposed relationship relative to each other, means for transmitting the driving force of said motor to said cutting blade assemblies, and means for momentarily reversing the polarity of the direct current to said motor. In the aquatic vegetation cutter of the present invention the means for transmitting is located in a plane that is disposed between the cutting blade assemblies, and each cutting blade assembly comprises a toothed, stationary cutting blade and a toothed movable cutting blade for reciprocating cutting motion disposed in use parallel to and below said stationary cutting blade and having its teeth on their side opposite to said stationary cutting blade exposed, whereby the actual cutting of a stem of aquatic vegetation takes place essentially when the stem is nipped between said movable cutting blade and said stationary cutting blade. The cutter of the present invention suitably also includes means for temporarily disengaging the transmission of driving force to said cutting blade assemblies when a greater than predetermined force resists reciprocation in the cutting blade assembly.

DESCRIPTION OF THE DRAWING

The aforementioned and additional features of the present invention are illustrated through a preferred embodiment of the invention described by reference being had to the drawing wherein:

FIG. 8 is a side elevational view of the bottom part of a second preferred embodiment of the invention;

FIG. 9 is a cross-sectional view taken along the line 9—9 of FIG. 8;

FIG. 10 is a cross-sectional view taken along the line 10—10 of FIG. 8;

FIG. 11 is a cross-sectional view taken along the line 11—11 of FIG. 9;

FIG. 12 is a cross-sectional view taken along the line 12—12 of FIG. 9;

FIG. 13 is a elevational view of a central portion of the reciprocating blade assembly taken from 13—13 in FIG. 9.

FIG. 14 is an elevational view of another central part of the reciprocating blade assembly taken from 14—14 in FIG. 9;

FIG. 15 is a cross-sectional view taken along the line 15—15 of FIG. 14.

FIG. 16 is an elevational view of an embodiment of the aquatic vegetation cutter of the invention;

FIG. 17 is a schematic showing of a tilting of the device relative to the mounting rod;

FIG. 18 is a cross-sectional view taken along the line 18—18 of FIG. 16;

FIG. 19 is a cross-sectional view taken along the line 19—19 of FIG. 18;

DESCRIPTION OF PREFERRED EMBODIMENTS

Figure 1:
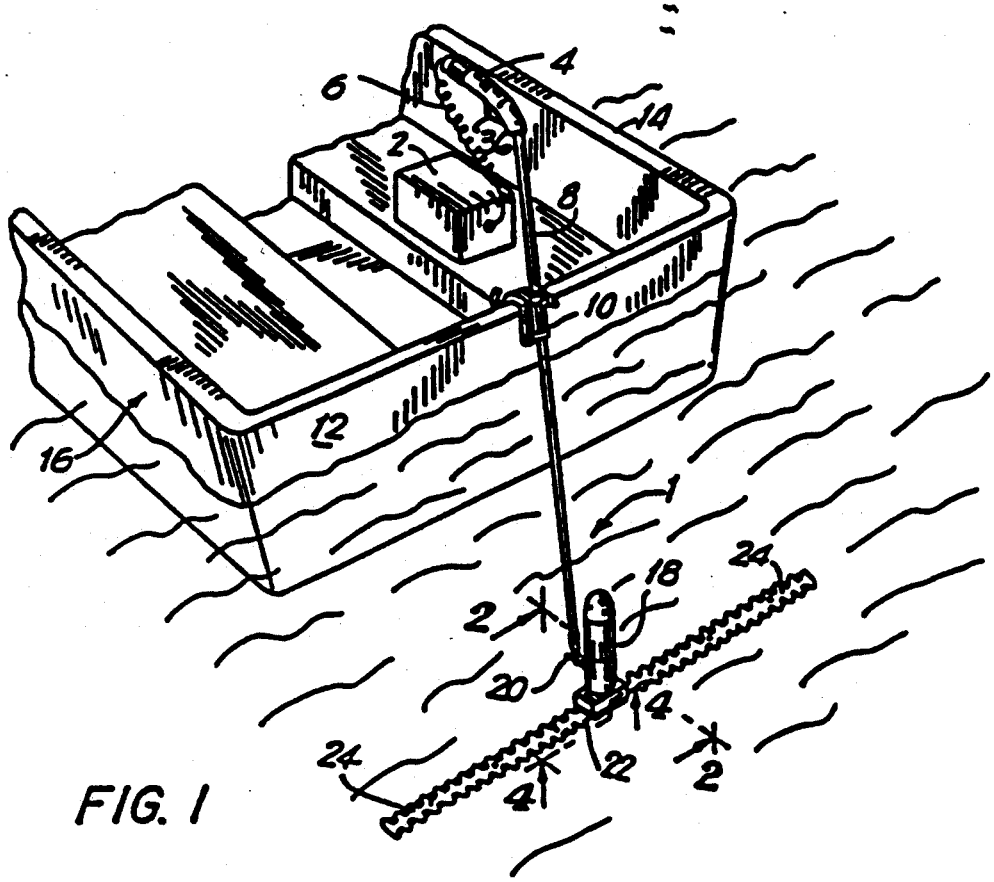
FIG. 1 is a perspective view of a preferred embodiment of the invention, when the cutter is mounted on the transom of a boat.
Figure 3:
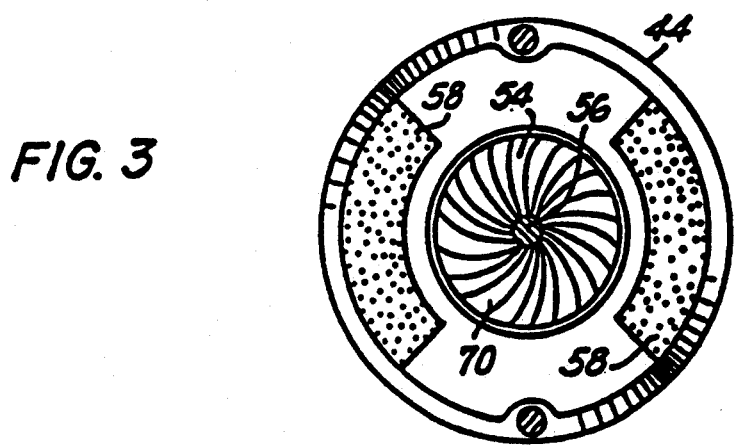
FIG. 3 is a cross-sectional view taken along the long 3—3 of FIG. 2.

As shown in FIGS. 1-5, an embodiment of the aquatic vegetation cuttter 1 of the present invention is powered by an electrical storage battery 2. The character of the battery is not significant; it can be of a one-time charge type or a rechargeable type, however the latter is generally more efficient. At one extremity of the vegetation cutter 1 is a handle 4 and the output of the battery 2 is suitably wired into the handle through a coiled cord 6. The handle 4 is suitably watertight and is disposed at one end of a mounting rod 8 which in the embodiment shown in FIG. 1, is attached by a clamp assembly 10 to the transom 12 of a boat 14. The mounting rod 8 ranges below the water level 16 and a motor assembly 18 is attached to the other end of the mounting rod by an adjustable attachment 20. In FIG. 1 a transmission 22 is disposed under the motor assembly 18 and two reciprocating cutting assemblies 24 extend from the transmission in opposite direction relative to each other.

Figure 2:
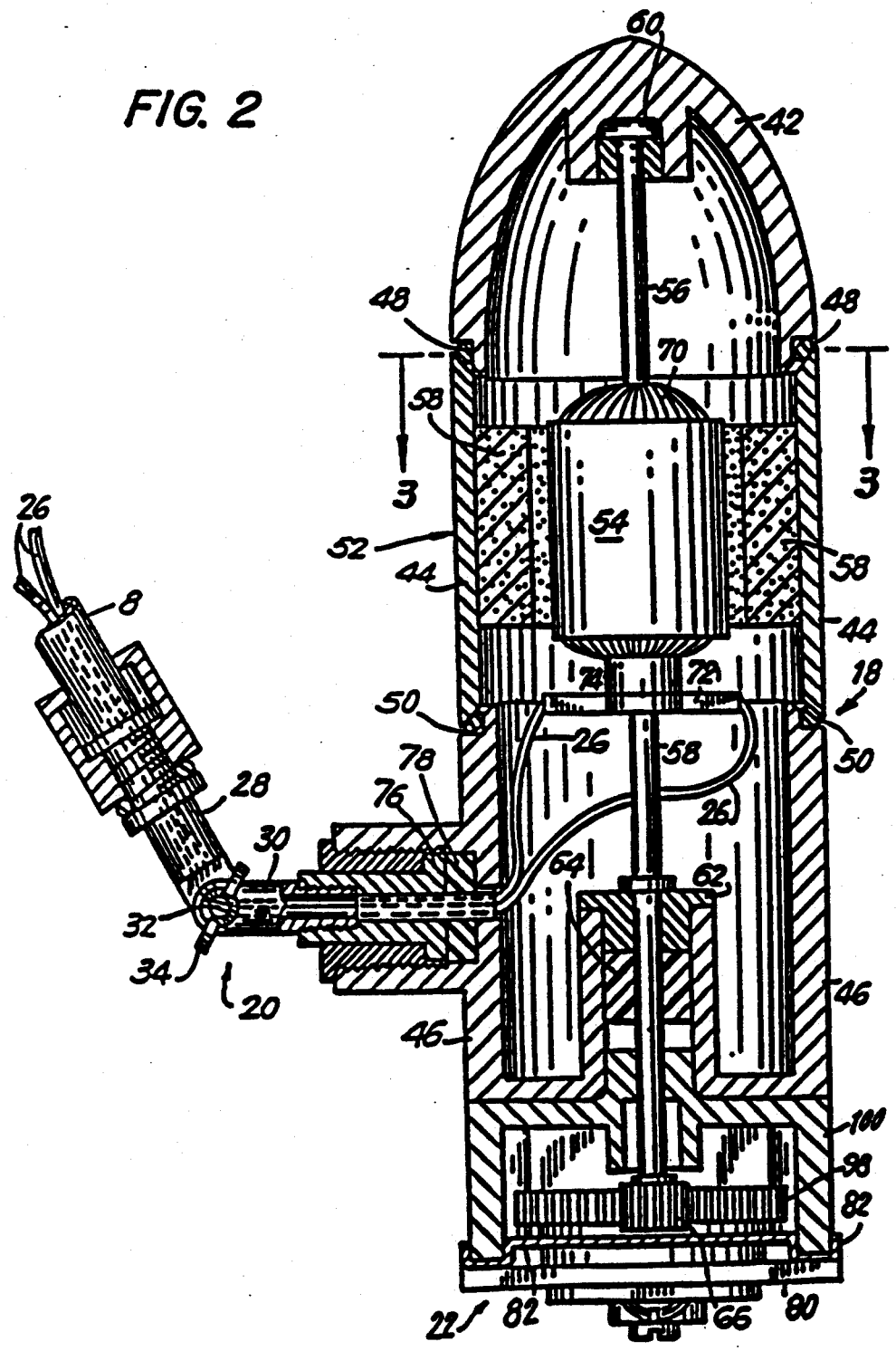
FIG. 2 is a cross-sectional view taken along the line 2—2 of FIG. 1.
Figure 4:
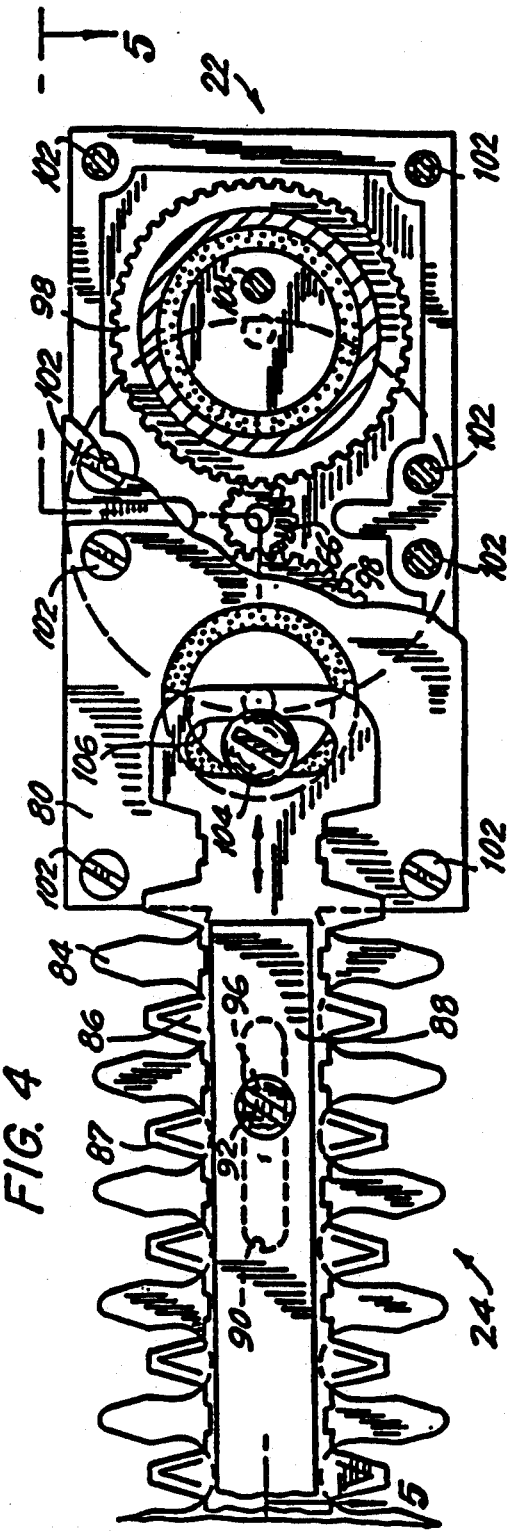
FIG. 4 is a bottom plan view, partially broken away, taken along the line 4—4 of FIG. 1.
Figure 5:
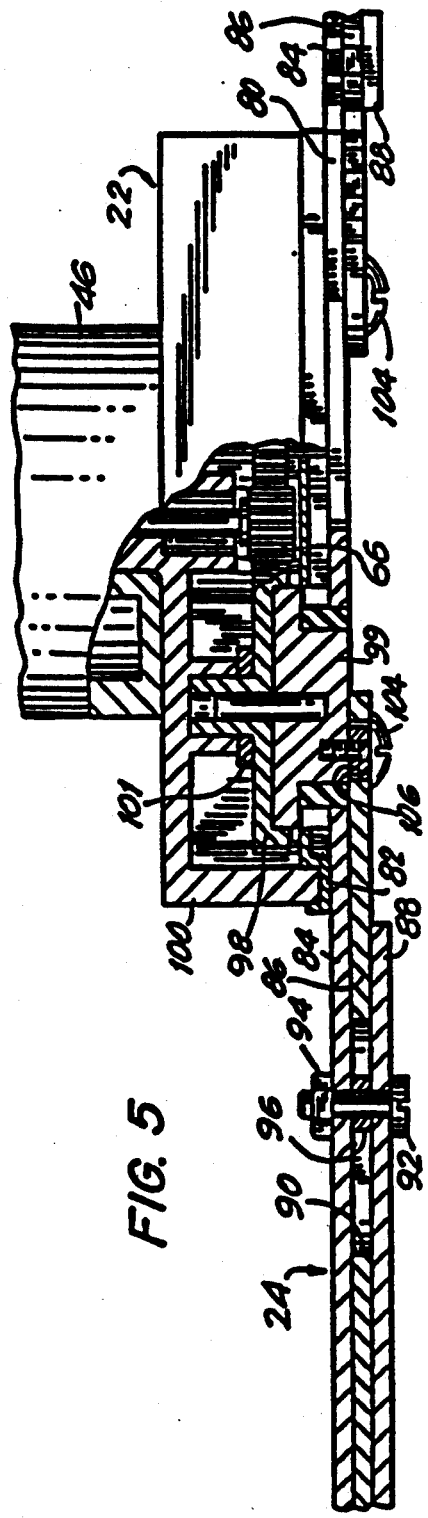
FIG. 5 is a partial cross-sectional and partially elevational view taken along the line 5—5 of FIG. 4.
Figure 6:
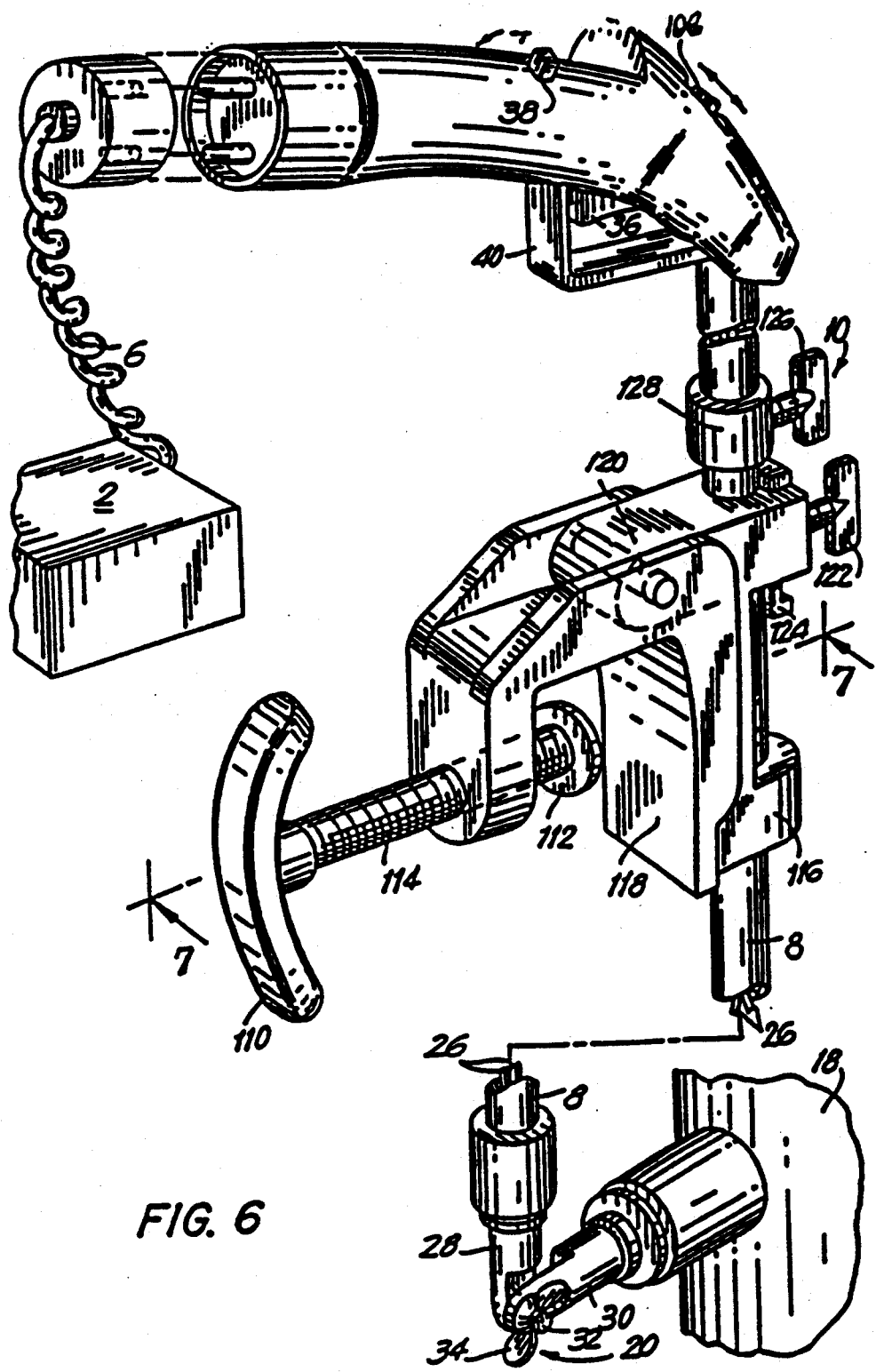
FIG. 6 is a perspective view of the parts of the preferred embodiment of the vegetation cutter, normally disposed above the water line and their connection to the remainder of the device under water.
Figure 7:
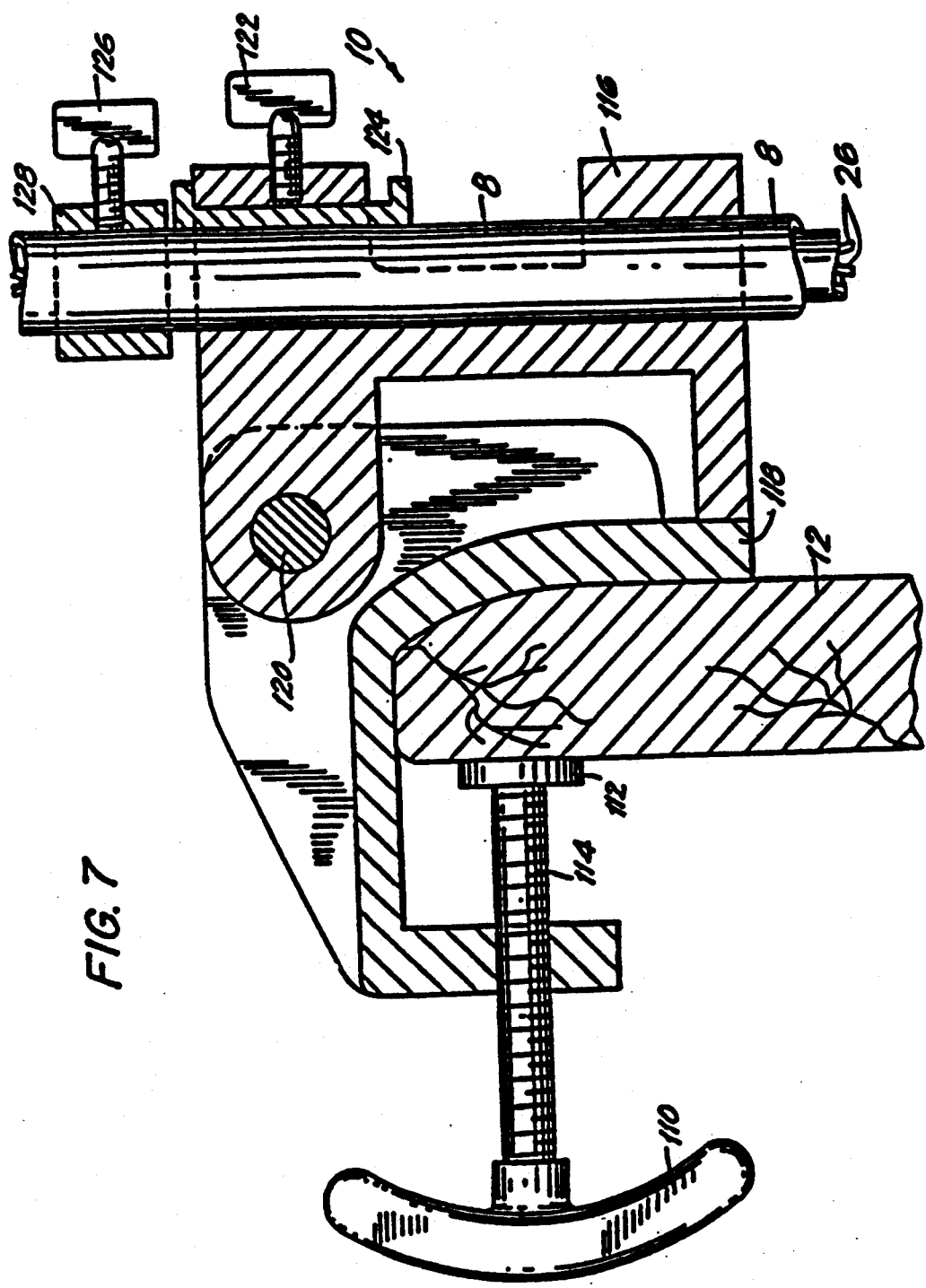
FIG. 7 is a cross-sectional view taken along the line 7—7 of FIG. 6.

As shown in greater detail in FIGS. 2 and 6, electric lead-in wires 26 represent a continuation of the connection to the battery by the coiled cord 6, to transmit electrical power to the motor assembly 18. The adjustable attachment 20 in its simplest form is comprised of an upper elbow joint member 28 and a lower elbow joint member 30 which can be fixed in various relative angular positions by a bolt 32 tightened by a wing nut 34. The lead in wiring 26 passes through the adjustable attachment. In this manner the adjustable attachment 20 permits adjustment of the attitude of the motor assembly 18 and the reciprocating cutting assemblies 24 relative to the mounting rod 8.

The adjustable attachment 20, shown in FIG. 6, more particularly the lower joint member 30, can also be rotated in its mounting in the lower housing element of motor assembly 18, to provide and even greater degree of freedom of movement and directional yield of the device to underwater obstructions. That rotation allows rotation of the reciprocating blade assemblies to a vertical position when, for example, it is required to pull the device vertically out of the water to clear a more troublesome snagging the blades. Suitably the upper elbow joint member 28 and the lower joint member 30 can be of an electrically nonconducting material to insulate from an electrical shock imparted to the underwater housing from reaching the operator of the device through the mounting rod 8. Another significant reason for providing a rotary freedom between the lower joint member 30 and the housing 18 is that when the bottom of the body of water where cutting takes place is on an incline, then the plane of the cutting blade assemblies becomes tilted to follow the inclined bottom.

While in this preferred embodiment the battery 2 is shown disposed in the boat 14 above the water level 16, a suitable battery could also be employed attached to the device under the water level 16, or disposed elsewhere, such as attached to the belt of the operator or worn by a should strap. Similarly, the electric cord 6 need not necessarily be a coiled cord, and can be disposed in other suitable locations in- or outside the mounting rod 8. For example, it could be disposed within the mounting rod 8 and introduced thereinto closer above the clamp assembly 10 and not necessarily through the handle 4. When the batteries are enclosed within the harvester, then no external cord 6 is required.

As shown better in FIG. 6, an on-off switch 36 is provided in the handle 4, suitably in the form of a trigger switch that can be releasably locked in the on-position by a locking button 38. The trigger switch guard 40 can prevent accidental, unintended actuation of the aquatic vegetation cutter 1.

The motor assembly 18 is disposed in a compact housing comprised of an upper housing element 42, a central housing element 44 and a lower housing element 46. These housing elements are mounted together in a water tight relation and are sealed from the intrusion of water at their respective interfaces by an upper O-ring 48 and by a lower O-ring 50. A direct current motor 52 is mounted in the central housing element 44. The motor 52 is comprised of a rotor 54 having an upper shaft 56 rotatable journaled in the upper housing element 42 at 60. The rotor 54 also has a lower shaft 58 which is rotatable journaled within the lower housing element 46 through water tight sealing busings 62 and 64. The lower rotor shaft 58 extends into the transmission 22 and is fixed in the hub of a transmission pinion gear 66.

The direct current motor 52 further comprises stationary magnets 58 attached to the interior of the central housing element 44. The rotor 54 includes a coil winding 70. The power is transmitted from the electric lead-in wires 26 through a transmitter brush assembly 72 to a collector 74 that is disposed for rotation with the rotor 54. The electrical lead-in wires 26 are lead into the lower housing element 46 through water tight packing members 76 and 78. The transmission 22 is provided with a lid 80 which is attached to a transmission housing 100.

The reciprocating cutting assembly 24 has a tooth stationary blade 84 and a toothed reciprocating blade 86 slidably disposed parallel to the stationary blade. The tops of the teeth of the reciprocating blade 86 are smooth. The edges of the teeth on the bottom are ground to a beveled edge 87. A retaining plate is disposed along the side of the reciprocating blade 86 that is opposite to the side along which the stationary blade 84 is arranged. It is very important that, in contrast to e.g. hedge trimmers with reciprocating blades, in the aquatic vegetation cutter of the present invention the teeth of the reciprocating blade 86 be disposed below the teeth of the stationary blade 84 and that the lower side of the teeth of the reciprocating blade be substantially downwardly exposed to the surrounding water. This is necessary, because it is unavoidable, especially when there is a great deal of silt or mud floating in the water, such as when stirred up by the device, for the solid particles to work themselves in between the two blades. The reciprocation of the blade 86 will work these particles loose and they can then drop down freely past the downwardly exposed reciprocating blade.

A groove 90 is provided in the reciprocating blade 86 and an assembly bolt 92 ranges through a hole in the retaining plate, the groove 90 and a hole in the stationary blade 84. The assembly bolt 92 is attached in place by means of an assembly nut 94, thus holding the blade assembly together. A plurality of assembly bolts 92 and assembly nuts 94 are provided throughout the length of each reciprocating cutting assembly to hold the blades 84, 86 and 88 together.

Suitably a low friction coefficient washer 96 such as one made of a PTFE polymer (suitably a polytetrafluoroethylene sold by E. I. DuPont & Co. under the trademark TEFLON) is provided within the groove 90 around the bolt 92. Suitably the washer 96 is very slightly thicker than the thickness of the reciprocating blade 86 to introduce a slight spacing between the blade and the adjacent stationary blade 84 and retaining plate 88. The reciprocation of the blade and the resulting reciprocating movement of the ends of the groove 90 brings some water into the slight clearance between the various parallel elements to provide for easier gliding of the surfaces adjacent to each other.

The pinion gear 66 in the transmission 22 engages larger driving gears 98 of each reciprocating cutting assembly. A driving clutch element 99 is disposed concentrically and in close frictional engagement with the driving gear 99. A spring washer 101 assists in the maintenance of the frictional engagement. The pinion gear 66 and the driving gears 98 are disposed in a transmission housing 100 that is located below the lower housing element 46. The lid 80 is attached to the transmission housing 100 with attaching screws 102. The eccentric drive screw 104 is rotated by the driving clutch element 99. A transverse driving screw groove 106 is provided in the end of each reciprocating blade 86 the longitudinal axis of the groove being perpendicular to the longitudinal axis of the blade. Each drive screw 104 is eccentrically fixed in the driving clutch element 99 for reciprocating the blade through the eccentric rotation of the drive screw 104.

Suitably the interior of the transmission 22 is packed with grease and the lid 80 formed from the end of the stationary blade 84, attached to the transmission housing 100 with screws 102, provides a cover. Advantageously a further outer cover (not shown) is provided from the interior ends of each blade 86 and eccentric drive 104, 106. The outer cover (not shown) is sealingly attached over the eccentric drive cavity by the use of a suitable gasket.

As the stem of an underwater plant to be cut is caught between the teeth of a stationary blade 84 and the reciprocating blade 86, the reciprocating blade pushes the stem of the plant against the stationary blade and nips it off at that point. In the same manner a rope or cable or a thicker rod may get caught in that nip and may foul the cutting blades which are generally set to stop reciprocating at that point when they encounter a resistance. For that case a momentary polarity changing switch 108 is provided suitably in the handle 4 of the vegetation cutter 1. Actuation of the switch 108 changes the polarity of the lead-in wires 26 to the DC motor 52. This will momentarily reverse the rotation of the motor as well as the direction of reciprocation of the reciprocating blade 86 to open up the nip between the teeth of the stationary blade 84 and of the reciprocating blade 86 *having substantially overlapping the teeth of each*, and release the tree limb or other object caught between them.

The clamp assembly 10 serves not only for attaching the device 1 to a transom 12. Its purpose also includes to facilitate h and held operation, and also when a cutting assembly 24 hits an underwater obstruction, to permit the cutting assemblies and the entire device additional freedoms of movement, such as to rotate away and thus to prevent the cutting assembly from hitting the obstruction again. Thus, if a large rock or bottle or other obstruction hits the toothed edge of the blades, the blades rotate out of the way into the direction of motion, thus to pass along the obstruction. In this case rotation of the mounting rod 8 in its support member 116 takes place. The handle 4 will then rotate out of position to indicate to the operator that the blade assemblies are disposed no longer transversely to the direction of cutting. When the obstruction is passed by, the operator can turn the device back into its operating position that is transverse to the direction of cutting travel by turning the handle 4.

The clamp 10 is provided with a handle 110. This handle provides a double function. It can be used to attach the clamp 10 to the transom 12 of a boat 14 by means of a pressure plate 112 rotatable affixed to that end of a threaded shaft 114 which is opposite to the end to which the handle 110 is attached. When the vegetation cutter 1 is manually operated without the use of a boat or other mounting base, then the pressure plate 112 is advanced fully inward by turning the handle 110, until its extreme inward position. Manual operation can be achieved by the operator holding by one hand to the handle 4 and with the other hand to the handle 110. In the case of manual operation with an external battery, then the battery 2 is suitably attached to the belt or a shoulder strap of the operator.

The clamp assembly 10 is comprised of two principal components, a mounting rod support member 116 and a clamping support member 118. The clamping support member is pivotally mounted from the mounting support member at 120. The mounting rod 8 ranges through an opening in the clamping support member 116. A manually adjustable setting screw 122 is tightened the pressure pad 124 presses against the mounting rod 8 and prevents it from rotary, or up and down movement within the mounting rod support member 116. The setting screw 122 is usually loose during the operation of the vegetation cutter 1. A setting screw 126 is threaded into a bore on a retaining collar 128 which is disposed around the mounting rod 8. The function of the retaining collar 128 with its setting screw 126 is to limit the depth under the water level 16 to which the underwater parts of the vegetation cutter 1 are immersed at any given time.

The clamp assembly 10 provides three further degrees of freedom of machine movement to adopt to variation in terrain, obstacles in the cutting path, and improving cutting ability. The freedom of the mounting rod 8 to rotate in the clamp was already explained above. The same rod support member 116 also allows a freedom of up and down movement of the machine, as may be required by variations in the depth of the bottom. Absent such a freedom of up and down movement in the clamp, a machine that would be rigidly attached to a boat, would bob the boat up and down upon the machine encountering variations in the bottom level. The third freedom assured by the clamp assembly 10 is a freedom to swing about the pivot 120. If an obstruction impacts on the center of the blade assemblies or rotation of the rod 8 in the support member 116 is otherwise prevented, then the device can tilt back and up out of the way of an obstruction, without any axial rocking of the boat. All of these freedoms of movement and avoidance permit the use of less sturdily dimensioned components and smaller diameters of rod 8 which not only account for lower cost, but even more importantly also enable significantly lighter weight and portability.

Another embodiment of the aquatic vegetation cutter is shown in FIGS. 8-15. As shown in FIG. 8, the cutting device 200 rests on the bottom of a body of water with a bottom roller 130 mounted to the device by a bottom roller bracket 132. The bottom roller 130 is retained in the bottom roller bracket by a roller axle 134. The bottom roller bracket 132 is attached with an assembly bolt 192 and an assembly nut 194 to a reciprocating cutting assembly 224.

As best shown in FIG. 9, the reciprocating cutting assembly 224 is comprised of a toothed stationary blade 184 and a toothed reciprocating blade 186. A retaining plate 188 separates the toothed reciprocating blade from the bottom roller bracket 132. Two reciprocating cutting assemblies 224 are disposed in an opposed relationship at the bottom of the cutting device 200, and a central retaining plate 189 is disposed between the two opposed ends of the retaining plates 188 in each reciprocating cutting assembly 224. The central retaining plate 189 is held in place by the bottom roller bracket 132. A groove 190 is provided in the toothed reciprocating blade 186. Suitably the end walls of the groove 190 are beveled, i.e. are disposed at an angle relative to the surface of the reciprocating blade 186.

A low friction coefficient washer, such as made of a PTFE material surrounds the shank of the assembly bolt 192, and is disposed within the groove 190. Also in this embodiment, the thickness of the washer 196 can suitably be just slightly greater than the thickness of the toothed reciprocating blade 186. The lubricating effect of a film of water between the reciprocating blade 186 and the adjoining stationary blade 184 and retaining blade 188 is enhanced by the water pumping action of the reciprocations of the beveled ends of the groove 190.

The driving force of an electric motor (not shown) is conveyed by a drive shaft 158 to a planetary transmission 222. The planetary transmission is comprised primarily of two ball bearings stages, a first stage 136 and a second stage 138. The first and second ball bearing stages are retained at their respective outer peripheral rings 140 in a housing. The drive shaft 158 imparts its rotary energy to an interior ring 1542 of the first stage ball bearing 136. Balls 144 of the first stage ball bearing 136 are disposed within the ball holding basket which maintains the balls 144 evenly distributed around its circumference. The ball holding basket 145 goes over the lower end of the first stage ball bearing 136 and partially covers that lower end. The lower or second stage ball bearing 138 is provided with an interior ring 147 which has an upwardly protruding part in positive driving engagement with a downwardly protruding part of the ball holding basket 145 of the first stage ball bearing 136. This is suitably accomplished by providing a concentric square opening within the ball holding basket 145 and a protruding, matingly square boss 149 concentric, and integral with the interior ring 147.

Thus the R.P.M. the drive shaft 158 is reduced in the first stage 136, and this reduced R.P.M. is output with a greater torque through the basket 145 driving the interior ring 147. The R.P.M. transmitted to the interior ring 147 is further stepped down in the second stage ball bearing 138. This slowed down rotation, with further increased torque is transmitted by ball holding basket 150 of the second stage ball bearing 138 to a cutting blade drive shaft 152. The engagement between the ball holding basket 150 can be suitably constructed similarly to the engagement between the ball holding basket 145 and the interior ring 147 through the square boss 149.

The cutting blade drive shaft 152 is journaled in a brass bushing 154 and is then sealed against water penetration by seals 156 secured by spring retainers 157. A driving gear 160 is attached by a setting screw 162 for rotation with the cutting blade drive shaft 152.

A driving eccenter shaft 164 is provided integral with the driving gear 160. The eccenter shaft 164 is surrounded with a rotary busing, such as a ball bearing 166. A reciprocating driving plate 168 (FIGS. 9, 13) is disposed between the interior, opposed ends of the reciprocating blades 186, and is attached for reciprocating each of these, by means of a key shaped boss 172 engaging a mating notch 174 in the end of each reciprocating blade 186.

A cowling 176 is attached with setting screws 178 to the bottom of the housing 146. A reentrant portion 180 of the cowling 176 provides a seal between the bottom edge of the housing 146 and the stationary blade 184. The opposing, interior ends of the stationary cutting blades 184 are attached with a locking plate 182 by locking screws 183 to the housing. The planetary transmission 222 can contain as many stages are are necessary to convert the speed and the torque of the driving force from the motor to the required speed and torque for reciprocating the cutting blade. The planetary transmission of the present invention also incorporates its own clutch to separate the rotation provided by the driving motor to the transmission, from the reciprocation of the blade. This is achieved in accordance with an embodiment of the present invention by providing a slippage between the inner ring and the ball basket of the ball bearing. The predetermined force at which a slippage will occur can be adjusted by providing a larger or lesser number of balls in the bearings of the transmission. The more balls, the higher the force at which the slippage occurs. Conversely, the fewer balls, the more readily slippage occurs. In providing the requisite number of balls they should be distributed about the inner ring in a peripherally uniformly spaced relationship.

As indicated above, it is highly desirable that the aquatic vegetation cutter of the present invention should be of a light weight construction. There is a slight minimum weight necessary to maintain the unit on the bottom of the body of water or at a predetermined depth under the water surface, and also to maintain the cutter in a cutting attitude even if moving the vegetation cutter against the vegetation to be cut would tend to tilt the cutter backward, i.e. to maintain a pressure against the vegetation to be harvested. On the other hand, any excess weight above the required minimum weight should be reduced as much as possible to facilitate the hand held, portable operation. Accordingly, the embodiments of the apparatus of the present invention generally shown in FIGS. 16–20 is provided with structural features which enable a very considerably reduced weight, thinner and lighter construction that some of the other preferred embodiments described herein. This is generally accomplished in the preferred embodiment described in the following, by the provision of a very small, fractional horsepower electric minimotor, considerably reduced weight, thinner and lighter cutting blade assemblies, the provision of more yieldable freedoms which assure additional yieldability and freedoms of movement of the apparatus to avoid obstructions, and this in turn, enables the use of thinner and lighter mounting rods which have thus less weight to support, and have to offer less resistance against dislocation. The lighter weight embodiment of the apparatus of the present invention also enables easier access to the bottom of the body of water and can also be more easily lifted out from the water, and carried by hand.

A perspective view of a particularly light weight embodiment of the present invention is shown in FIG. 16, wherein a power cord 406 is shown as supplying power to an operating handle 404 attached to the top end of a mounting rod 408. The mounting rod can be a single tubular member, or a telescopically extendable tubular member, or can be adapted to be attached through one or more mounting rod extensions 409 to a motor assembly 418 at the bottom end of the mounting rod or any extensions thereof, through an adjustable attachment 420 which is suitably an adjustable elbow between the bottom end of the mounting rod or extension thereof and the lower housing element 546. Reciprocating cutting blade assemblies 424 range outwardly, opposed to each other, from the motor assembly 418.

As shown in FIGS. 17, 22, 28, and 29, the adjustable attachment is comprised of an upper elbow joint member 428 and the lower elbow joint member 430 attached to each other through a lap joint through a screw 432, and can be locked in a fixed relationship by tightening a wing nut 434 resulting in an interlocking of mating serrations 435 in the overlapping joint surfaces of the upper and lower elbow joint members 428 and 430. Electric lead in wires 426 pass through the adjustable attachment 420, from the mounting rod 408 into the motor assembly 418. Advantageously the upper and lower elbow joint members 428 and 430 are made of an electrically nonconducting material to avoid the transmission of any electrical shock from the motor assembly 418 through the mounting rod 408 and any extension 409 thereof. Such a shock can occur, for example, when a cutting blade assembly 424 cuts into a live submarine cable.

Figure 29:
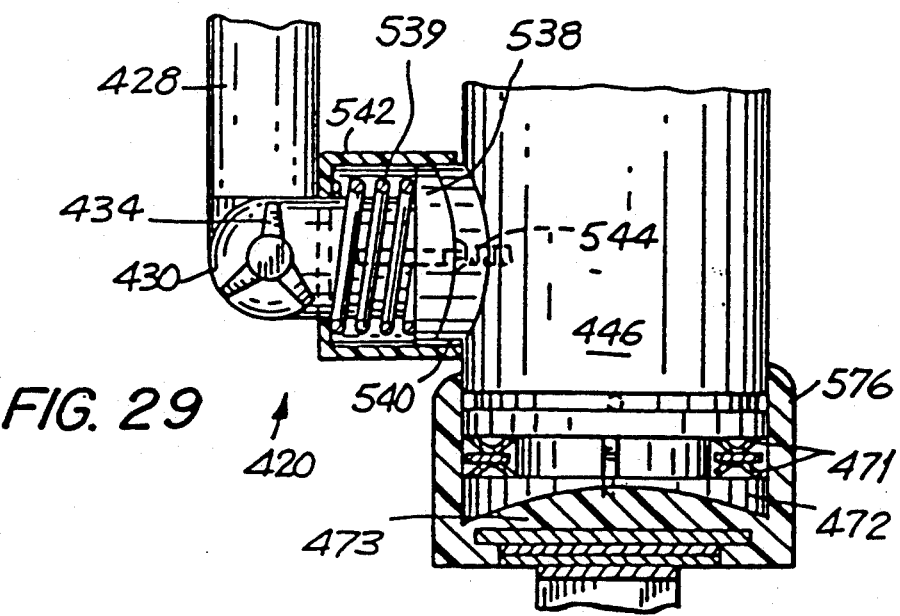
FIG. 29 is a cross-sectional view of another embodiment of the type of coupling shown in FIG. 28, and of the coupling of the cutting blade assemblies, to the motor housings.

As best shown best in FIGS. 17 and 29, the motor assembly 418 with the blade assemblies 424 is pivotable about the adjustable attachment 420 relative to the vertical. This feature, as indicated, is particularly useful in cutting vegetation growing from sloping bottoms and also for enabling the cutter to be pulled out of the water when it becomes completely tangled up at one end of a blade assembly into an obstruction, which requires taking the device out of the water. The adjustable attachment 420 as shown in FIG. 29 is provided with a spring loaded arrangement normally tending to return the blade assemblies to the horizontal position to become substantially perpendicular to the vertical.

A spring 539 urges a rotatable returning member 538 having a convex surface, against a matingly concave surface of a fixed returning member 540. The fixed returning member is attached firmly to the lower housing 546 by an appropriately curved surface thereof laying up against the housing and by means of an attaching screw 544 tightened into a threaded bore in the wall of the lower housing element. A cover 542 is attached to the lower elbow joint member and extends over the spring 539 the rotatable returning member 538, and the fixed returning member 540, and extends substantially until the outer surface of the lower housing 546. As an obstruction or other force tends to rotate the motor assembly 418 as shown FIG. 17, to assume an angle relative to the vertical, the convex surface of the rotating returning member rides up on the convex wall of the fixed returning member and the two surfaces no longer mater with each other. The rotating returning member, as urged by the spring 539, wants to return to its stable position to mate with the concave surface of the fixed returning member 540. Therefore, the motor assembly 418 has a tendency to return to the vertical, so that the cutting blade assemblies 424 are again perpendicular to the vertical. The same result can be accomplished if the apparatus of the present invention is brought into contact with a substantially level bottom surface of the body of water.

In a particularly preferred embodiment to the present invention a float 547 is employed in conjunction with the aquatic vegetation cutter. The float is pivotable about an axis 549 which also serves as an extension of the axis of a bottom roller 530. Depending on whether the device is pushed by the mounting rod 408, or is pulled by it, the position of the float is either as shown in solid lines in FIG. 22, or as shown therein broken lines. The float 547 serves a double purpose. In one of its uses it tends to prevent the machine of the present invention from sinking into an overly muddy bottom of the body of water and allows the machine to glide over the bottom in addition to rolling on the bottom roller 530. In another use of the float 547, it enables a particular mode of aquatic vegetation cutting by the operator standing on the shore such as at a seawall, or on a pier, or manually from a boat. In this mode of use the mounting rod 408 and suitably any elongations thereof, by extending telescoping members (not shown), or by one or more extension rods 409, the device of the present invention is pushed out as far into the water away from the position of the operator as possible. This is enabled by the float which at this point is filled with air and maintains the machine buoyant more or less on the surface of the water. Water readily enters through one or more orifices 536 which displaces the air from within the float 547 through bidirectional spring loaded air valves 555. The float 537 fills up with water and the device sinks to the bottom. At that point the mounting rod 408 and possible extensions 409 are being used to pull the machine towards the on shore operator. Upon encountering such a pull, the float pivots about the axle 549 to the position shown in broken lines in FIG. 22. Since not all of the air may have been displaced from the interior of the float, any remaining air adds further buoyancy to the entire apparatus. As the apparatus is being pulled towards the operator, it cuts the aquatic vegetation in its path. When the apparatus has been pulled up to under the feet of the operator, the machine can be pulled vertically out of the water at which point the float 547 assumes a vertical position. Upon reaching the surface of the water, the float will drain out water through the openings 536 and air can enter through the bidirectional, spring loaded air valves 555.

The operating handle 404 has a substantial number of components built into it. The handle is water tight, so that it can be immersed into water without any damage to its components.

When batteries 402 are disposed within the mounting rod 408, then there is no requirement for the power cord 406. Therefore, the power cord can be attached by a removable, waterproof attachment (not shown) to the handle 404. The device is actuated by an on-off switch 436 which can be locked in the "on" position with a locking button 438. A current sensor 437, such as a bimetallic switch, is arranged suitably in the mounting rod 408 for disconnecting the power from the driving motor if the motor begins to draw undesirable amount of current from the battery. This can happen, for example, when the blades are snagged and the motor is placed under greater load. A signaling light 441 normally emits a green light to show that the device is in operation and the motor is running. When a problem is encountered and the current sensor switch 437 is actuated, the green light 441 turns to red and a buzzer 439 will sound. In that manner both a visual and an audible signal are provided to indicate a problem. A polarity changing switch 508 is provided for the momentary changing of the polarity of the driving current to the motor to release any snagged obstruction. A switch guard 440 is provided to guard the device from undesired actuation.

In addition to the audible and visual indications of the operating conditions of the device, the operating handle 404 provides yet another indication of the condition of the apparatus. When the operating handle points inwardly along the longitudinal axis of a boat, the blade assemblies 424 are in the cutting position, i.e. perpendicular to the longitudinal axis of the boat. When the mounting rod 408 rotates freely within the clamp assembly 410, and the blade assembly 424 hits an obstruction which would rotate the blade assemblies in a direction away from the perpendicularity of the longitudinal axis of the boat, a resulting rotation in the position of the operating handle 404 will indicate to the operator that the blade assemblies are out of the cutting position, and enables him to rotate the unit back into the cutting position by simply turning the operating handle. If no resistance is met to turning the operating handle, then cutting can be continued with the proper blade assembly orientation.

Figure 25:
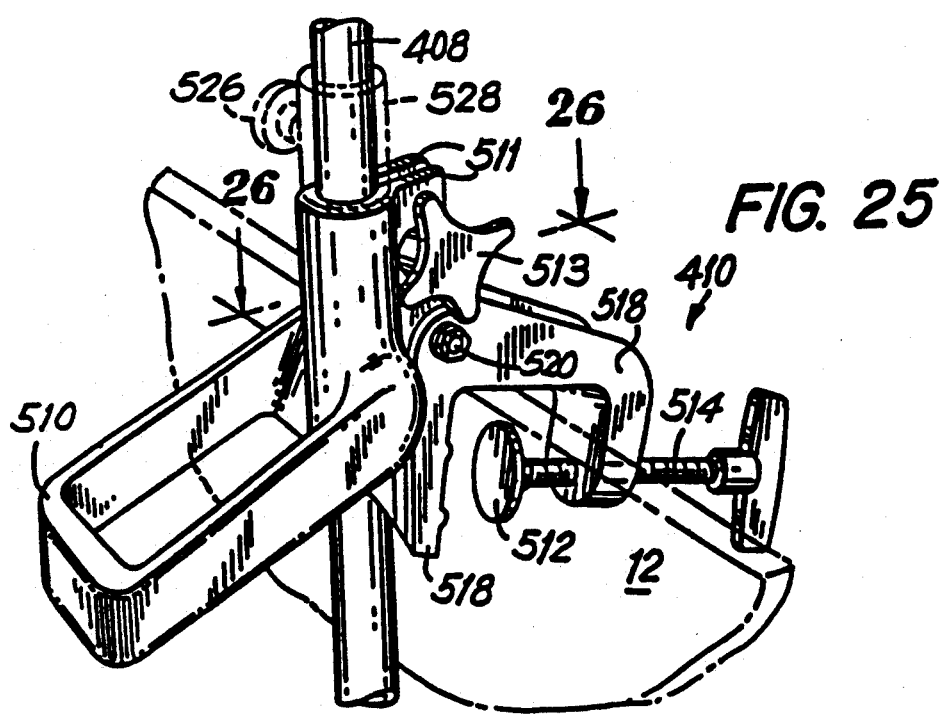
FIG. 25 is an elevational view of amounting handle with boat clamp on the mounting rod.
Figure 26:
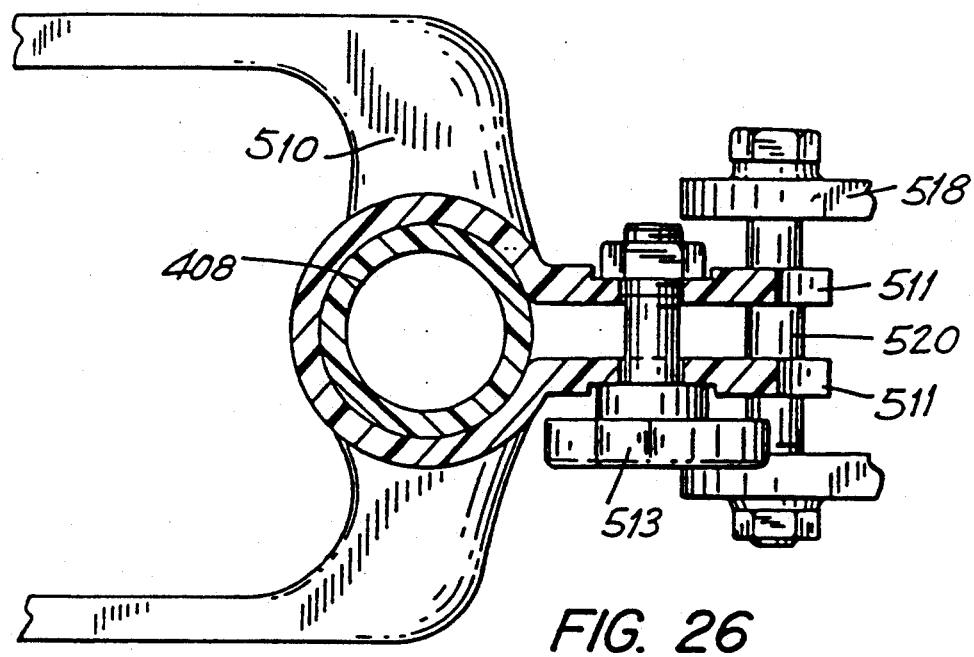
FIG. 26 is a cross-sectional view taken along the line 26—26 of FIG. 25.

A simple clamp assembly 410, as shown in FIGS. 25 and 26, is comprised of a mounting handle 510 which has an opening at one end for the mounting rod 408 to pass through. The mounting rod 408 freely slides up and down within that opening, unless compressible sleeve extensions 511 are pressed together with a sleeve extension compressing screw 513. In that manner the slightly tilting mounting handle 510 can be hooked over e.g. a transom of a boat or a support for simple operation or for storage of the device of the present invention. Normally the sleeve extension compressing screw 513 is left loose and the clamp assembly 410 freely slides around as well as along the mounting rod 408. It is often desirable, however, to limit the amount of downward traveling freedom of the mounting rod 408 in the clamp assembly 410, therefore suitably a retaining collar 528 can be fixed in a position on the mounting rod 408 by means of a setting screw 526. In this manner, if a sudden drop in the bottom is encountered, it can be avoided that the entire length of the mounting rod 408 above the clamp assembly 410 would suddenly slide down through the clamp assembly until the clamp impacts on the operating handle 404.

A clamping support member 518 is pivotably attached with a screw 520 to the mounting handle 510. The clamping support member facilitates attachment of the device of the present invention, such as to the transom 12 of a boat. This is accomplished by tightening a threaded shaft 514 and pressing the attaching pressure plate 512 at its end against the interior surface of the transom 12. In its attached position the mounting handle faces outwardly from the transom.

In addition to the ability of the mounting rod 408 to rotate within the mounting handle 510 and also to move up and down in it, a further degree of freedom is provided for the apparatus of the present invention by the ability to pivot about the pivot axle screw 520 of the clamping support member 518. Thus, if in the forward cutting movement of the device an obstruction cannot be cleared by horizontal rotation of a blade assembly 524, then the mounting rod 408 and any extension 409 thereof will pivot backward and upwardly to clear any obstruction in that manner.

Figure 27:
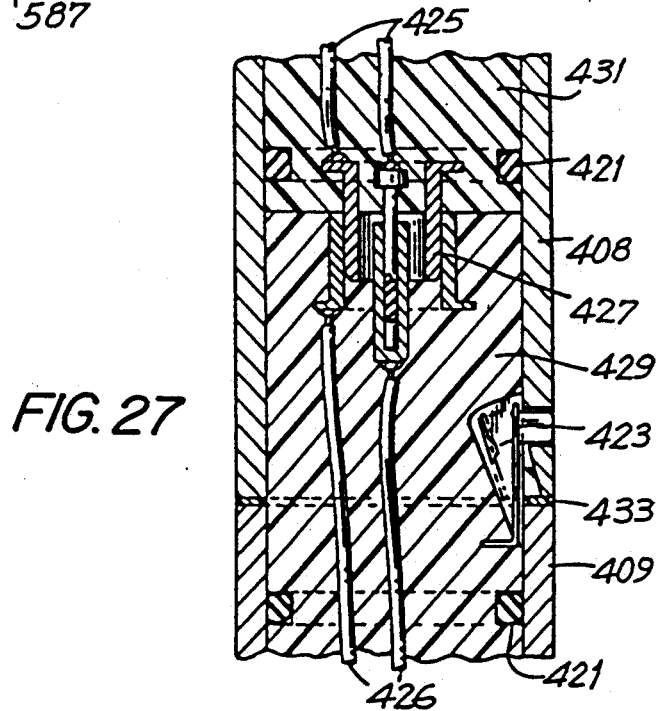
FIG. 27 is a cross-sectional view taken along the line 27—27 of FIG. 22, showing the coupling of the mounting rod or mounting rod extension.
Figure 28:
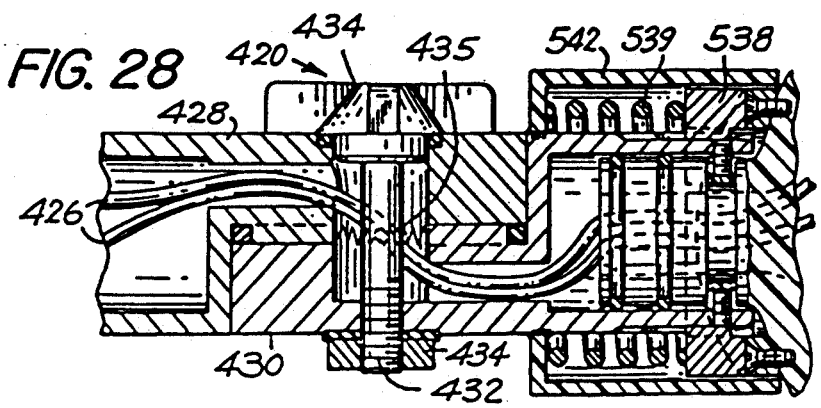
FIG. 28 is a cross-sectional view taken along the line 28—28 of FIG. 22 of the elbow connecting the mounting rod to the motor housing.
Figure 22:
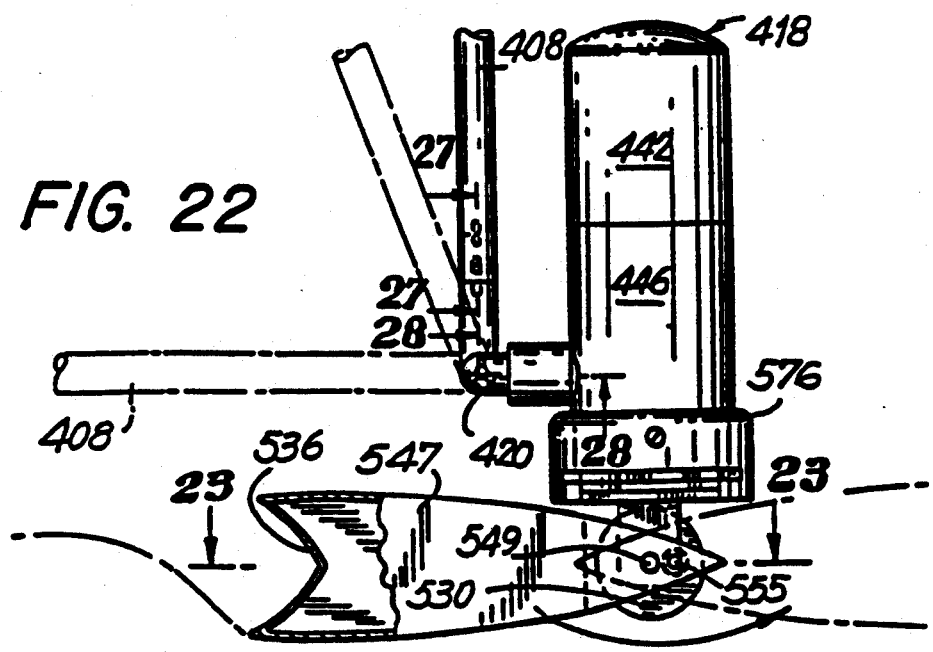
FIG. 22 is a bottom side view of the apparatus showing a partial cross-sectional view of a float member.
Figure 23:
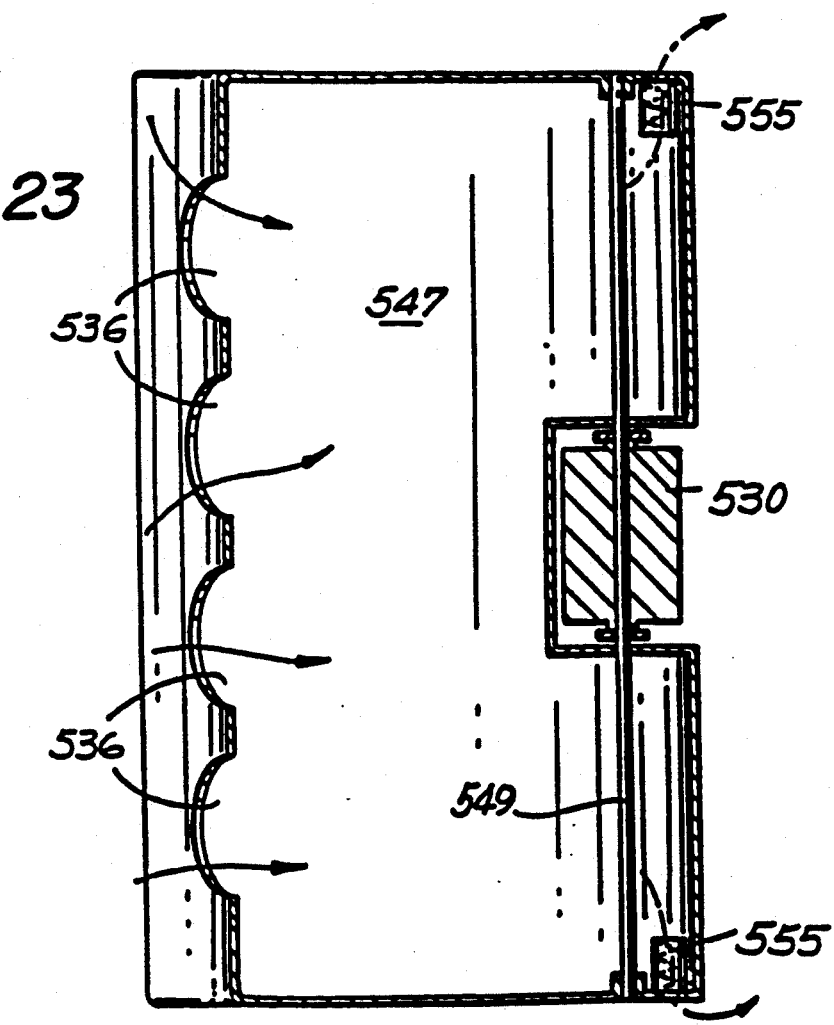
FIG. 23 is a cross-sectional view taken along the line 23—23 of FIG. 22.
Figure 24:
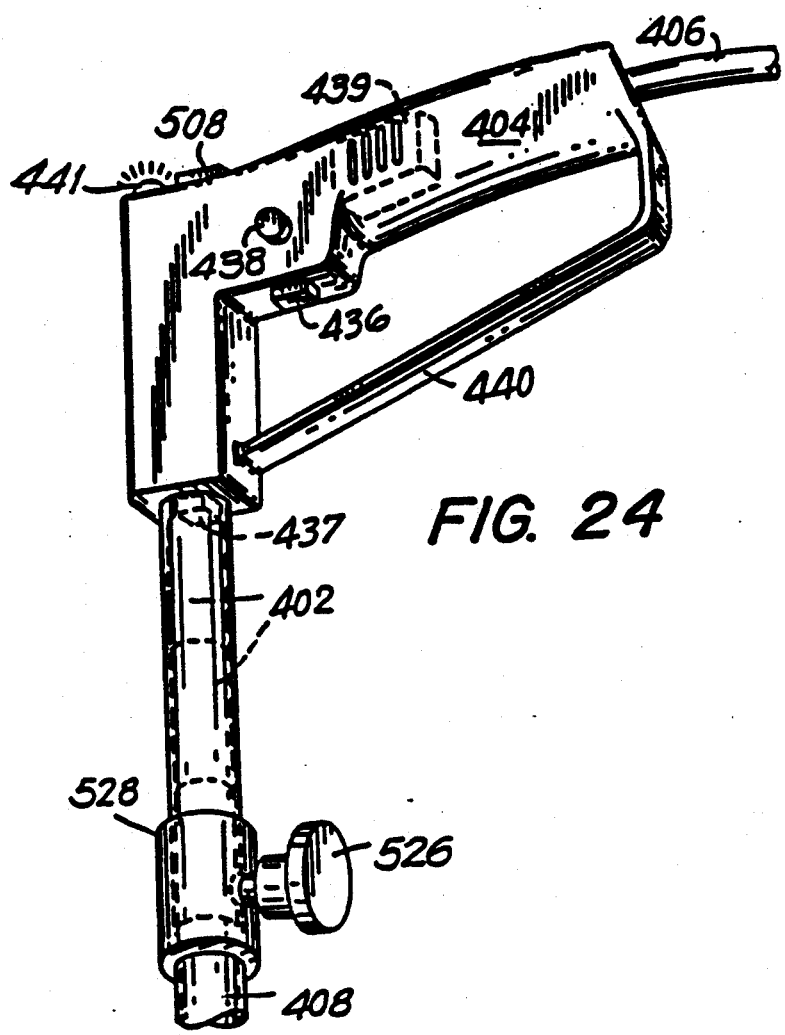
FIG. 24 is an perspective view showing the operating handle at the upper end of the mounting rod.

Mounting rod extensions 409 can be simply and easily coupled to the mounting rod 408 as shown in FIG. 27. In pushing together a mounting rod 408 with an extension 409 the lead-in wires 425 from the mounting rod are connected to the lead-in wires 426 of the extension 409 through a coaxial connector 427. Thus, electrical connection can be established by simply pushing the two parts together, and the connection can be simply broken by pulling hem apart. Suitably the coaxial connector part in the mounting rod or the lower end of a mounting rod extension is the female part, while the connector part in the top of each mounting rod extension is a male plug. This is, because the part that is capable of being electrified before the two parts are connected, is in this manner unable accidentally to connect both pole ends causing a short circuit.

One half of the electrical connector 427 is swaged or otherwise affixed into a center opening of a cylindrical electrically nonconductive insert 429 and protruding outwardly from the mounting rod extension 409, and the other half of the coaxial connector 427 is partially fixed in a bore of a cylindrical nonconductive insert 431 which is recessed within the mounting rod 408. The metallic mounting rod 408 and its metallic extension 409 are abutted against each other, but they are electrically insulated from each other by a nonconducting washer 433. Thus, it can be seen that the nonconductive inserts 429 and 431 join the two halves of the coaxial connector 427 at a different height of the rod than the joinder of the metallic pipes themselves. The pipes can be locked together by one or more spring-loaded snap-in quick release members 423 which are mounted so that no electrically conductive path is established between the mounting rod 408 and its extension 409. Sealing O-rings 421 are disposed in appropriate grooves of the cylindrical nonconductive inserts 429 and 431 to prevent water from entering within the mounting rod 408 and its extension 409.

Figure 20:
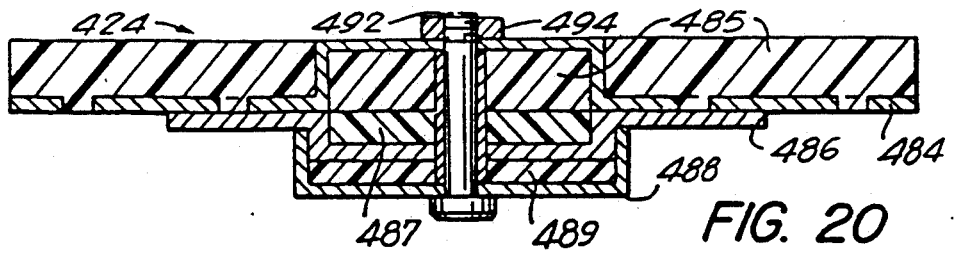
FIG. 20 is a cross-sectional view taken along the line 20—20 of FIG. 16.

FIG. 20 illustrates one embodiment of a cutting assembly 424. In this cutting assembly the toothed stationary cutting blade 484 and a toothed reciprocating cutting blade 486, as well as a retaining plate 488 are so thin that they could not be maintained level for cutting purposes, or could not withstand the loading stresses of the machine against vegetation, without additional reinforcement. Accordingly, the toothed stationary cutting blade 484, toothed reciprocating cutting blade 486, and the retaining plate 488 are all formed with central reinforcing channels. Furthermore, reinforcing plastic inserts 485, 487, and 489 are provided respectively for the stationary cutting blade 484, the reciprocating cutting blade 484, and the retaining plate 488. Suitably orifices, most suitably tapering orifices are provided in the cutting blade and the retaining plate so that the plastic can become anchored by the material solidifying in these openings for retention therein. The various blades with their plastic inserts are held together by screws 492 and corresponding nuts 494.

Figure 21:
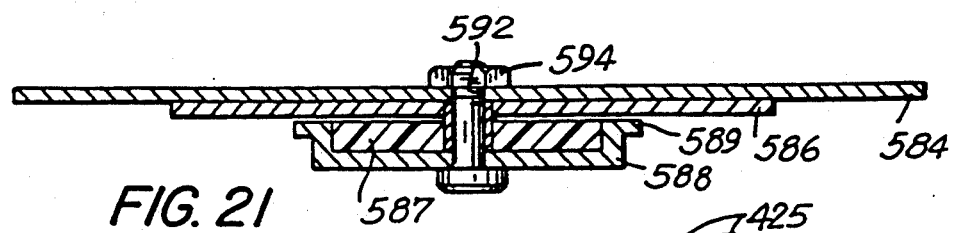
FIG. 21 is another cross-sectional view of a different cutting assembly, similarly taken as in the case of FIG. 20.

In another embodiment of the cutting blade assembly shown in FIG. 21, there is not as much of the plastic reinforcement shown as in FIG. 20 and the stationary cutting blade 584 and the toothed reciprocating cutting blade 586 are formed without any reinforcing channels. Only the retaining plate 588 is formed with a reinforcing channel containing a layer of reinforcing plastic 587. The retaining plate 588 is formed on each side with a small horizontal extension 589 which extends slightly outwardly past the base of the teeth of the reciprocating cutting blade. Most of the underside of the teeth of the reciprocating cutting blade, however, is exposed to the surrounding water. The purpose of the extension 589 is to prevent the flexing of the teeth of the cutting blade and an undue separation of the teeth of the reciprocating and stationary cutting blades when an object is encountered which is possibly somewhat more difficult to cut through.

FIGS. 18 and 19 show the interior arrangements in the motor assembly 418. A water pressure sensor 454 communicates with the water exterior to an upper housing 442 for a DC electrical motor 452. The water pressure sensor, or any other suitable sensor assures that no electrical current can reach the motor 452, unless the motor assembly 418 is entirely under water.

The motor 452 is a small, fractional horsepower minimotor producing a high R.P.M. in its output shaft 457. A first stage transmission pinion gear 466 drives first stage planetary transmission gears 456 which roll on the internally toothed sleeve 458. The planetary transmission gears 456 are journaled in disc 459 which rotates a second stage pinion 460. The pinion rotates second stage planetary transmission gears 461 which also roll on the internally toothed sleeve 458.

The second stage planetary transmission gear 461 are journaled in a plate which is attached to the cutting blade drive shaft 552. The shaft 552 passes through a plurality of watertight seals 556 held in place by spring retainers 557. The drive shaft 552 transmits its energy to a drive eccenter shaft 564 for driving the reciprocating cutting blade.

The motor assembly 418 is disposed within a housing which comprises an upper housing 442 and a lower housing 446 that are screwed together. The planetary transmission is disposed within an upper planetary transmission housing 462 which is screwed together with a lower planetary transmission housing 463. The internally toothed sleeve 458 is firmly attached to the interior of the upper planetary transmission housing 462. A ball bearing clutch arrangement is disposed within the lower planetary transmission housing 463. An upper row of balls 464 is disposed within ball nests in a ball nesting member 465, and a lower row of balls 466 is perched against the upper row of balls 464 by a circular spring 469 through a circular pressure disk 470.

When the toothed reciprocating blade is arrested from reciprocating motion and, therefore, the cutting blade drive shaft 552 is blocked from rotation, the second stage planetary transmission gears will no be able to rotate the cutting blade drive shaft 552 but, instead, will engage the teeth on the internally toothed sleeve 458 and tend to rotate that sleeve. The tendency of the sleeve 458 to rotate will bring the upper row of balls 464 into rotation against the pressure of the lower row of balls 468 and bring a relative dislocation between the individual balls 464 and 468. When the obstruction preventing the drive shaft 552 from rotation, has been cleared, the pressure of the circular spring 469 upon the circular pressure disk 470 and upon the lower row of balls 468 pressing against the upper row of balls 464 will stop the internally toothed sleeve from rotation and then the rotation of the drive shaft 552 can be resumed.

As shown in FIGS. 18 and 29, a cowling 576 covers the lowest part of the motor assembly 418. A further degree of yieldable freedom is provided to the apparatus of the present invention by enabling the cutting blade assemblies 424 to rotate in a horizontal plane not only together with a mounting rod 408, but also relative to the other parts of the motor assembly 418. This yieldable freedom of movement is, similarly to the adjustable attachment 420 in FIG. 29, tending to return the blades into their stable position from which they were turned by a temporary obstruction. In the same manner as shown in FIG. 25 for the adjustable attachment 420, springs 471 urge the concave surface of a stationary returning member 472 against the convex surface of a rotatable returning member 473. In the embodiment shown the spring force 471 comprises to oppose spring washers for increased bias. The stable, mating relationship of the members 472 and 473 resists, due to the spring pressure, the turning in the horizontal plane to the blade assemblies through rotation of the lower, rotatable returning member 473, unless the force tending to bring about such rotation can defeat the resistance of the force of the springs 471.

The preferred embodiments of the present invention provide a simple construction for the cutting device for the present invention which can be most easily maintained, because the parts that are most likely to wear out sooner, can be readily separated and replaced without the replacement with an undue number of other parts.

The preferred embodiments of the present invention are described only for purposes of illustration. The breadth of the present invention is determined by the scope of the following claims.

I claim:

1. A light weight, portable, aquatic vegetation cutter which comprises a direct current electrical motor for generating a driving force, two reciprocating type elongated cutting blade assemblies disposed in a substantially end-to-end opposed relationship relative to each other, each of said cutting blade assemblies comprising a toothed stationary cutting blade and a toothed reciprocating cutting blade, means for transmitting the driving force of said motor to said blade assemblies, means for preventing the intrusion of water to preselected parts of the aquatic vegetation cutter, and means for momentarily reversing the polarity of the direct current to said motor for bringing the teeth of said stationary and said reciprocating blades in a substantially overlapping relationship.

2. The light weight, portable, aquatic vegetation cutter of claim 1, further comprising means for cutting off the driving force of said motor when the position of said aquatic vegetation cutter exceeds a preselected angle deviating from the vertical, and means for cutting off the driving force of said motor when the aquatic vegetation cutter is not immersed in a predetermined depth of water.

3. The light weight, portable, aquatic vegetation cutter of claim 2, wherein said means for cutting off comprises a level switch for preventing electric power from being conducted to said motor.

4. The light weight, portable, aquatic vegetation cutter of claim 1, further comprising a mounting rod having a first and a second end, a handle secured against the intrusion of water attached to the first end of said mounting rod, said means for reversing being part of said handle, said motor being attached from said second end of said mounting rod, and means for transmitting electrical current through said mounting rod to said motor.

5. The light weight, portable aquatic vegetation cutter of claim 4, wherein said mounting rod comprises means for extending the length thereof.

6. The light weight, portable, aquatic vegetation cutter of claim 5, wherein said means for extending comprises one or more mounting rod extensions each having a quick coupling means for attachment to the second end of a mounting rod or said second end of a mounting rod and the second end of one or more extensions between said second end and said motor.

7. The light weight, portable, aquatic vegetation cutter of claim 6, wherein the mounting rod and the one or more mounting rod extensions each contain at least two electrical conductors for transmitting electricity to said direct current motor, said one or more mounting rod extensions each has a first end and a second end, and said quick coupling means further comprises an electrical connector for said electrical conductors within said second end of the mounting rod and each mounting rod extension, said electrical connector in said mounting rod being quickly connectable to a mating electrical connector within the first end of each mounting rod extension.

8. The light weight, portable, aquatic vegetation cutter of claim 7, wherein the coupling in the second end of the mounting rod and in each mounting rod extension is a female electrical coupling, and the coupling in the first end of each mounting rod extension is a male electrical coupling.

9. The light weight, portable aquatic vegetation cutter of claim 6, wherein said quick coupling means further includes a mechanically releasable snap coupling for holding the mounting rod securely together with a mounting rod extension, and a mounting rod extension together with another mounting rod extension, or for connecting the second end of the mounting rod or of a mounting rod extension from said motor.

10. A light weight, portable, aquatic vegetation cutter which comprises a motor for providing a driving force through a shaft, two elongated reciprocating type cutting blade assemblies disposed in a substantially end-to-end opposed relationship relative to each other, means for transmitting the driving force of said motor to each of said blade assemblies, said means for transmitting being disposed in a plane intermediate said blade assemblies, each cutting blade assembly comprising a toothed, stationary cutting blade, and a toothed reciprocating cutting blade for reciprocating cutting movement disposed in use parallel to and having its cutting teeth substantially exposed below said toothed stationary cutting blade, each of said blade assemblies further comprising a holding plate that is substantially narrower than the width of said reciprocating blade, said plate being disposed parallel to and below said reciprocating blade on the side thereof that is opposite to the side that is adjacent to said stationary blade, said holding plate, said reciprocating blade and said stationary blade being connected together to form a blade assembly the width of said holding plate being such that it covers the beginning of the teeth of said reciprocating blade, but the substantial majority of the lower surface of said teeth is exposed without being covered by said holding plate.

11. The light weight, portable, aquatic vegetation cutter of claim 10, wherein said holding plate is formed with an elongated reinforcing channel therein.

12. The light weight, portable, aquatic vegetation cutter of claim 11, wherein said elongated reinforcing channel contains a plastic reinforcing channel filler.

13. The light weight, portable aquatic vegetation cutter of claim 11, wherein said stationary cutting blade, or said reciprocating cutting blade, or both said stationary and said reciprocating cutting blades each have elongated reinforcing channels formed therein.

14. The light weight, portable aquatic vegetation cutter of claim 13, wherein one or more of said elongated reinforcing channels contain a plastic reinforcing channel filler.

15. The light weight, portable, aquatic vegetation cutter of claim 12, wherein said reinforcing channels are formed with apertures therein, and the plastic of said reinforcing channel filler penetrates into said apertures for improved attachment between the reinforcing channel and a reinforcing channel filler therein.

16. The light weight, portable, aquatic vegetation cutter of claim 15, wherein said apertures are tapering in a direction away from the interior of an adjacent reinforcing channel.

17. A light weight, portable aquatic vegetation cutter which comprises a direct current electrical motor for generating a driving force, two reciprocating type cutting blade assemblies disposed in a substantially opposed relationship relative to each other, means for transmitting the driving force of said motor to said cutting blade assemblies, each cutting blade assembly comprising a toothed, stationary cutting blade, and a toothed reciprocating cutting blade for reciprocating cutting motion disposed in use parallel to and having its cutting teeth substantially exposed below said toothed stationary cutting blade, said toothed reciprocating blade has a longitudinal axis and at least one elongated groove is provided in said reciprocating blade along said longitudinal axis, said groove having tapering end walls in the thickness of said blade, and an assembly screw is disposed within said groove and is surrounded in said groove by a spacer made from a synthetic material, said spacer being higher than the thickness of said reciprocating blade, whereby water is admitted between said reciprocating blade and said stationary blade, said means for transmitting comprising two ball bearings connected in series, with the ball carrying basket of the first ball bearing being adapted to transmit its driving force to the inner ring of the second ball bearing, and the rotary output of the ball carrying basket of the second ball bearing is transmitted to the reciprocating type cutting blade assemblies, and further comprising a gear driven by the rotary output of said ball carrying basket of said ball bearing, a driving pin mounted eccentrically from said gear, and a slotted connecting plate having a transverse slot therein, said slotted plate being attached to the opposed, interior ends of the reciprocating cutting blades of the cutting blade assemblies, said pin ranging through the slot in said slotted plate for reciprocatingly driving said reciprocating blades of the two cutting blade assemblies.

18. The light weight, portable aquatic vegetation cutter of claim 17, further comprising a level switch for preventing electric power from being conducted to said motor when the position of said vegetation cutter exceeds a preselected angle deviating from the vertical.

19. A light weight, portable aquatic vegetation cutter comprising two elongated, reciprocating type cutting blade assemblies disposed in an end-to-end opposed relationship, a motor for providing a driving force for said blade assemblies, a transmission disposed adjacent to said motor for transmitting the driving force from said motor to said blade assemblies, said motor and said transmission being disposed within an elongated common housing having a longitudinal axis, said elongated common housing being disposed in a plane between the cutting blade assemblies, a mounting rod having two ends, a handle attached from the first of said ends, said mounting rod being attached at its second end directly or indirectly to said common housing, and yielding means disposed between said rod and said common housing to connect said rod from said common housing and adapted to vary the angle between said rod and said longitudinal axis of said housing in two directions which are substantially perpendicular to each other.

20. The light weight, portable, aquatic vegetation cutter of claim 19, wherein said yielding means comprises an adjustable elbow having two stems lockingly pivotable relative to one another, said pivotable elbow stems being the first of said two variable angle directions, the second end of said mounting rod being attached by a rotatable attachment from one of said stems, the other of said stems being rotatably attached from said elongated housing, said rotation providing the second of said two variable angle directions.

21. The light weight, portable aquatic vegetation cutter of claim 20, wherein said rotatable attachment comprises a rotatable returning part having a curved surface, a fixed returning part having a surface curved in the opposite sense as the curved surface of said rotatable returning part, the curved surface of said fixed returning part being adapted to nest in a single rotational position of said rotatable returning part within the curved surface of said rotatable returning part, and a spring for urging said rotatable returning part into said single rotational position.

22. The light weight, portable aquatic vegetation cutter of any one of claims 19-21, further comprising means for enabling rotation of both elongated, reciprocating type cutting blade assemblies together in a plane that is horizontal when the plane of the two assemblies is perpendicular to the vertical.

23. The light weight, portable aquatic vegetation cutter of claim 22, wherein said elongated, reciprocating type cutting blade assemblies are joined from each other at their respective inner ends from said transmission through a rotatable blade mounting including said means for enabling, said rotatable blade mounting being rotatable with respect to said elongated common housing, said rotatable blade mounting comprising a rotatable returning part having a curved surface, a fixed returning part having a surface curved in the opposite sense as the curved surface of said rotatable returning part, the curved surface of said fixed returning part being adapted to nest in a single rotational position of said rotatable returning part within the curved surface of said rotatable returning part, and a spring for urging said rotatable returning part into said single rotational position.

24. The light weight, portable, aquatic vegetation cutter of claim 20, wherein at least one of said two stems is from ann electrically nonconducting material.

25. The light weight, portable, aquatic vegetation cutter of claim 19, further comprising a clamp assembly disposed releasably on said mounting rod intermediate to said first and said second ends thereof.

26. The light weight, portable, aquatic vegetation cutter of claim 25, wherein said clamp assembly comprises a mounting handle portion and a clamping support portion pivotably connected from said mounting handle portion, said mounting rod releasably ranging through said mounting handle portion, whereby when said clamping support portion mounts said aquatic vegetation cutter from a boat, three yieldable directions of freedom of motion are provided for the vegetation cutter, a first of said directions of freedom being freedom of substantially horizontal rotation of said mounting rod within said mounting handle portion, a second of said directions of freedom being essentially vertical slidability of said mounting rod within said mounting handle portion, and the third of said directions of freedom being pivotability between the mounting handle portion and the mounting rod therein and the clamping support portion attached to a boat.

27. The light weight, portable aquatic vegetation cutter of claim 26, further comprising vertically adjustable lockable means disposed on said mounting rod between said first end and said clamp assembly for limiting the freedom of downward slidability of said mounting rod in said mounting handle portion.

28. A light weight, portable aquatic vegetation cutter which comprises a direct current electrical motor for generating a driving force, two reciprocating type elongated cutting blade assemblies disposed in a substantially end-to-end opposed relationship relative to each other, means for transmitting the driving force of said motor to said blade assemblies, means for preventing the intrusion of water to preselected interior parts of the aquatic vegetation cutter, an elongated mounting rod, all of the aforesaid means being disposed at one end of said mounting rod and adapted to be immersed under water, and operating handle means disposed at the other end of said mounting rod for indicating above the water the position of the cutting blade assemblies during operation.

29. The light weight, portable aquatic vegetation cutter of claim 28, wherein said operating handle means further includes means for visually indicating the "on" condition of the electric motor and the operation of the cutting blade assemblies.

30. The light weight, portable aquatic vegetation cutter of claim 28, wherein said operating handle means further includes means for visually indicating an operating condition problem in the cutting operation of the cutting blade assemblies.

31. The light weight, portable vegetation cutter of claim 29, wherein said operating handle further includes means for emitting an audible alarm signal indicating an operating condition problem in the cutting operation of the cutting blade assemblies.

32. The light weight, portable aquatic vegetation cutter of claim 30, further comprising a current sensor for disconnecting electrical supply from said motor when the current drawn by said motor exceeds a predetermined level, said problem condition resulting in the disconnection of the electrical supply.

33. The light weight, portable aquatic vegetation cutter of claim 28, further including a sensor disposed at a location of said aquatic vegetation cutter that in its operating position is disposed under water, said sensor being adapted to sense when the aquatic vegetation cutter is in said operating position and electrically to disconnect said motor when the aquatic vegetation cutter is not in said operating position.

34. The aquatic vegetation cutter of claim 33, wherein said sensor is a pressure sensor disposed in a watertight manner within a housing for said motor, said sensor being adapted to sense the pressure outside said housing through an opening in said housing, and to prevent electricity from reaching the motor when the pressure outside the housing is below a predetermined value.

35. The light weight, portable aquatic vegetation cutter of claim 28, wherein said motor, the drive shaft of the motor, and said means for transmitting are disposed in a common housing, said motor being a high R.P.M. fractional horsepower minimotor, and said means for transmitting comprise a planetary transmission having a step down ratio of at least 30:1, wherein said planetary transmission is disposed within a normally stationary internally toothed sleeve and comprises at least two first stage planetary transmission gears driven by a pinion gear attached to the drive shaft of the motor, said planetary transmission gears rolling on the internally toothed sleeve and being journaled for rotation in a first stage drive disk adapted to rotate a second stage pinion gear, said second stage pinion gear is adapted to drive at least two second stage planetary transmission gears which are adapted also to roll on the internally toothed sleeve and being journaled for rotation in a second stage drive disk adapted to rotate a drive shaft for said reciprocating cutting blade assemblies.

36. The light weight, portable aquatic vegetation cutter of claim 35, wherein the planetary transmission further comprises a clutch comprised of two rows of balls biased against each other by a spring, whereby upon the drive shaft for said reciprocating cutting blade assemblies being arrested from rotation, the force of the spring biasing the two rows of balls is overcome, the two rolls of balls commence rotation relative to each other, and said normally stationary internally toothed sleeve commences rotation.

* * * * *